(12) United States Patent
Zhang et al.

(10) Patent No.: US 11,397,741 B2
(45) Date of Patent: Jul. 26, 2022

(54) HEURISTIC INSPECTION METHOD TO FIND CAUSES OF SYSTEM ABNORMALITY BASED ON DYNAMIC UNCERTAIN CAUSALITY GRAPH

(71) Applicant: BEIJING YUTONG INTELLIGENCE TECHNOLOGY CO., LTD., Beijing (CN)

(72) Inventors: Qin Zhang, Beijing (CN); Zhan Zhang, Beijing (CN)

(73) Assignee: BEIJING YUTONG INTELLIGENCE TECHNOLOGY CO., LTD., Beijing (CN)

( * ) Notice: Subject to any disclaimer, the term of this patent is extended or adjusted under 35 U.S.C. 154(b) by 808 days.

(21) Appl. No.: 16/096,675

(22) PCT Filed: May 30, 2016

(86) PCT No.: PCT/CN2016/083906
§ 371 (c)(1),
(2) Date: Oct. 25, 2018

(87) PCT Pub. No.: WO2017/185449
PCT Pub. Date: Nov. 2, 2017

(65) Prior Publication Data
US 2021/0256030 A1 Aug. 19, 2021

(51) Int. Cl.
*G06F 17/10* (2006.01)
*G06F 17/11* (2006.01)
(Continued)

(52) U.S. Cl.
CPC .... *G06F 16/24578* (2019.01); *G06F 16/2462* (2019.01); *G06F 17/10* (2013.01); *G06F 17/11* (2013.01); *G06N 7/005* (2013.01)

(58) Field of Classification Search
CPC .... G06F 16/24578; G06F 17/11; G06F 17/10; G06F 16/2462; G06N 7/005
See application file for complete search history.

(56) References Cited

U.S. PATENT DOCUMENTS

| | | | |
|---|---|---|---|
| 8,255,353 B2 | 8/2012 | Zhang et al. | |
| 9,697,503 B1 * | 7/2017 | Penilla | B60K 35/00 |

(Continued)

FOREIGN PATENT DOCUMENTS

| | | |
|---|---|---|
| CN | 101127100 A | 2/2008 |
| CN | 101484891 A | 7/2009 |

(Continued)

OTHER PUBLICATIONS

Zhang; "Dynamic Uncertain Causality Graph for Knowledge Representation and Reasoning: Discrete DAG Cases"; Journal of Computer Science and Technology; vol. 27 Issue 1; Jan. 2012; 23 pages.

(Continued)

*Primary Examiner* — Mohamed Charioui
(74) *Attorney, Agent, or Firm* — BakerHostetler

(57) ABSTRACT

Provided is a method for ordering X-type variables having states to be measured in a dynamic uncertain causality graph (DUCG). The method comprises: step 1: determining, on the basis of a DUCG simplified using E(y) as a condition, a measurable X-type variable having a state to be measured, an index set thereof being S x(y), where y is a time series; step 2: if there is only one element in S x(y), ending ordering; step 3: calculating ranking importance $I_i(y)$ for X $_i(i \in S x(y))$; step 4: ranking X $_i(i \in S x(y))$ according to the ranking importance I i(y), and performing state measurement on an X-type variable of $i \in S x(y)$ by referring to the ranking; and step 5: adding 1 to y, and repeating steps 1-5 until there is no X-type variable to be measured. The technical solution of the invention can quickly diagnose a (Continued)

cause of an object system abnormality at minimum cost, and effectively returns the object system to normal.

7 Claims, 8 Drawing Sheets

(51) Int. Cl.
  *G06N 7/02*   (2006.01)
  *G06F 16/2457*   (2019.01)
  *G06F 16/2458*   (2019.01)
  *G06N 7/00*   (2006.01)

(56) References Cited

U.S. PATENT DOCUMENTS

2003/0070108 A1* 4/2003 Groen ................ G06F 11/008
   714/1
2010/0205138 A1* 8/2010 Zhang .................... G06N 7/02
   706/52

FOREIGN PATENT DOCUMENTS

CN        103745261 A      4/2014
WO    WO 2007/134495 A1   11/2007

OTHER PUBLICATIONS

Zhang et al.; "Dynamic Uncertain Causality Graph for Knowledge Representation and Probabilistic Reasoning: Statistics Base, Matrix, and Application"; IEEE Transactions on Neural Networks and Learning Systems; vol. 25 No. 4; Apr. 2014; p. 645-663.

Zhang; "Dynamic Uncertain Causality Graph for Knowledge Representation and Probabilistic Reasoning: Directed Cyclic Graph and Joint Probability Distribution"; IEEE Transactions on Neural Networks and Learning Systems; vol. 26 No. 7; Jul. 2015; p. 1503-1517.

Zhang; "Dynamic Uncertain Causality Graph for Knowledge Representation and Reasoning: Continuous Variable, Uncertain Evidence, and Failure Forecast"; IEEE Transactions on Systems, Man, and Cybernetics: Systems; vol. 45 No. 7; Jul. 2015; p. 990-1003.

Zhang et al.; "Dynamic Uncertain Causality Graph Applied to Dynamic Fault Diagnoses of Large and Complex Systems"; IEEE Transactions on Reliability; vol. 64 Issue 3; Sep. 2015; p. 910-927.

Zhang et al.; "Dynamic Uncertain Causality Graph Applied to Dynamic Fault Diagnoses and Predictions with Negative Feedbacks"; IEEE Transactions on Reliability; vol. 65 Issue 2; Jun. 2016; 15 pages.

International Patent Application No. PCT/CN2016/083906; Int'l Written Opinion and the Search Report; dated Jan. 26, 2017; 6 pages.

* cited by examiner

HEURISTIC INSPECTION METHOD TO FIND CAUSES OF SYSTEM ABNORMALITY BASED ON DYNAMIC UNCERTAIN CAUSALITY GRAPH

FIELD OF THE INVENTION

This invention is about an AI technology to process uncertain causality type information represented by Dynamic Uncertain Causality Graph (DUCG). Based on the technical scheme proposed in this invention, through computation with computer, one can rank the variables to be detected optimally, detect the ranked variables sequentially or group by group to find out their states, to diagnose causes of system abnormality as earlier and less cost as possible, and then enable to take effective actions to make system normal.

BACKGROUND OF THE INVENTION

There exist many cause events that may lead to abnormalities of industrial systems, social systems and biological systems, such as short circuit of coils, pump fails to run, failure of components, malfunction of sub-systems, blocking of pathway, entry of foreign matter, pollution, infection, damage, decrepitude of tissue or organ, etc. When system abnormality appears, people need to know the real cause event as soon as possible. Denote $B_n$ or $BX_n$ as these cause event variables indexed by n and $B_{nk}$ or $BX_{nk}$ as the event that $B_n$ or $BX_n$ is in state k. The difference between $B_n$ and $BX_n$ is that $B_n$ represents root-cause variable without input while BX has inputs reflecting the influence of other factors. Usually, k=0 means that $B_n$ or $BX_n$ is in normal state; k=1, 2, 3 . . . means that $B_n$ or $BX_n$ is in abnormal state. Most of the states of $B_n$ and BX cannot be or are hard to be detected directly. Furthermore, there are a large number of factors that have causal relationships to $B_n$ or $BX_n$, such as temperature, pressure, flow, velocity, frequency, various chemical or physical test results, investigation results, imaging examination results, acoustic examination results, and so on. Some factors may increase or decrease the occurrence probability of $B_{nk}$ (k≠0), e.g. region, time, environment, season, religion, age, sex, skin color, career, blood relation, hobbies, personality, living conditions, working conditions, etc. The affected $B_{nk}$ is $BX_{nk}$. All these factors can be represented by event variable $X_i$, while $X_{ij}$ represents state j of $X_i$. $X_i$ and $X_{ij}$ also represent cause or consequence of other variables/events. Usually, j=0 means that X is in normal state; j=1, 2, 3 . . . means that X is in abnormal state. By detecting the states of $X_i$, people can diagnose the root cause ($B_{nk}$ or $BX_{nk}$ (k≠0)) of system abnormality, so that be able to take effective actions in time to get the system back to normal or reduce damage. Dynamic Uncertain Causality Graph (DUCG) is an AI scheme to represent the uncertain causal relationships among event variables graphically, and perform diagnoses based on the constructed graph and observed evidence E composed of known states of X-type variables $X_{ij}$. For example, $E=X_{1,2}X_{2,3}X_{3,1}X_{4,0}X_{5,0}$, where comma separates the variable index (the first) and state index (the second). In general, the more the state known X-type variables in E, the more accurate the diagnosis can be. Yet some state known X-type variables contribute little or none to the diagnosis, some contribute a lot. In practice, there exist cost to detect the states of X-type variables. Therefore, one may have to choose some to detect, or detect some earlier and some later. The problem to be solved in this invention is as follows:

Based on
(1) the constructed DUCG,
(2) evidence E(y) observed by the time indexed with y (y=0, 1, 2, . . . ),
(3) possible cause events included in hypothesis set $S_H(y)$ diagnosed conditional on E(y), which state-unknown and detectable X-type variable should be detected to update evidence E(y) as $E(y+1)=E^+(y)E(y)$, so that more accurate diagnoses $S_H(y+1)$ conditional on E(y+1) can be made as soon and with less cost as possible. Where, the new detected states of X-type variables are the new evidence denoted as $E^+(y)$, the new hypothesis set denoted as $S_H(y+1)$ is diagnosed conditional on E(y+1), and y=0 means the time no evidence received, that is, E(0) is a complete set denoted as E(0)=1.

The possible cause event in $S_H(y)$ or $S_H(y+1)$ is represented as $H_{kj}$, in which $H_k$ is one or a set of variables indexed by k, for example, $H_1=BX_1$, $H_2=BX_2B_4$, etc., and j indexes the state combination of the set of variables, for example, $H_{1,2}=BX_{1,2}$, $H_{2,3}=B_{1,3}X_{4,2}$, etc.

An example of DUCG is illustrated in FIG. 1. In DUCG, B-type variable or event is drawn as rectangle, X-type variable or event is drawn as circle, BX-type variable or event is drawn as double line circle, G-type variable or event representing the logic relationship is drawn as gate, and D-type variable or event is drawn as pentagon representing the default or unknown cause of X-type variable/event. The {B-, X-, BX-, G-, D-}-type variable/events are also called nodes.

Variable $G_i$ represents the logic combinations of input variables. It must have at least two inputs connected with directed arc ⟶. The logic combinations are specified by logic gate specification $LGS_i$. For example, in FIG. 1 $G_1$ is specified by $LGS_1$: $G_{11,1}=B_{3,1}X_{111,1}$, $G_{11,2}=B_{3,1}X_{111,2}$, $G_{1,0}$=Remnant State that is defined as all other state combinations.

The textual descriptions of {B-, X-, BX-, D-, G-}-type variables and their states can be given according to their physical meanings. All {B-, X-, BX-, D-, G-}-type variable/event can be direct cause variable/event, and is called parent variable/event, and can be represented by V∈{B, X, BX, D, G} with the same index. For example, $V_2=X_2$, $V_{3,2}=B_{3,2}$, etc. Direct consequence or child variables/events are usually {X-, BX-}-type variables/events.

Directed arc ⟶ from parent to child is used to denote the weighted functional variable $F_{n;i}$ representing the causal relationship between parent variable $V_i$ and child variable $X_n$ or $BX_n$. $F_{n;i}$ is an event matrix. $F_{nk;ij} \equiv (r_{n;i}/r_n)A_{nk;ij}$ represents the causal relationship between parent event $V_{ij}$ and child event $X_{nk}$ or $BX_{nk}$. Where $r_{n;i}>0$ quantifies the uncertain causal relationship intensity between $V_i$ and $X_n$ or $BX_n$, $r_n \equiv \Sigma_i r_{n;i}$, and $A_{nk;ij}$ represents the uncertain causal mechanism that $V_{ij}$ may cause $X_{nk}$ or $BX_{nk}$. The probability of $A_{nk;ij}$ is defined as $a_{nk;ij}=Pr\{A_{nk;ij}\}$ usually given by domain experts. Define $f_{nk;ij}=Pr\{F_{nk;ij}\}=(r_{nk;ij}/r_n)a_{nk;ij}$, in which $f_{nk;ij}$ means the probabilistic contributions from $V_{ij}$ to $X_{nk}$, satisfying $$Pr\{X_{nk}\} = \sum_{i,j} f_{nk;ij} Pr\{V_{ij}\}.$$

$F_{nk;ij}$, $f_{nk;ij}$, $A_{nk;ij}$ and $a_{nk;ij}$ are member event in $F_{n;i}$, $f_{n;i}$, $A_{n;i}$ and $a_{n;i}$ respectively. Define $v_{ij}=Pr\{V_{ij}\}$, v∈{b, x, bx, d, g}.

In general, the lower case letters represent the probabilities of the corresponding upper case letters that represent events or event variables.

The weighted functional event matrix $F_{n;i}$ can also be conditional on a condition event $Z_{n;i}$, which can be drawn as dashed directed arc ---→. Conditional $F_{n;i}$ is used to represent the conditional causal relationship between its parent event vector $V_i$ and its child event vector $X_{nk}$ or $BX_{nk}$. The condition event $Z_{n;i}$ determines whether $F_{n;i}$ holds or not (discarded). Taken $Z_{n;i}=X_{1,2}$ as an example, when $X_{1,2}$ is true, $F_{n;i}$ is held, i.e. ---→ becomes ——→; when $X_{1,2}$ is false, $F_{n;i}$ is not held, i.e. ---→ is discarded.

For simplicity, the letter of a variable in each graphical node symbol can be ignored and only the indices are inside as shown in FIG. 2, in which the first number is the index of the variable and the second number is the state index of the variable. Since D-type variable has only one state, there is only one index inside the symbol. Non-D-type variables with known state can be indicated by colors, e.g. $X_{110,1}$ is blue in FIG. 2. If there is only one number in the symbol, the state of the variable is unknown.

With the received evidence $E(y)=E'(y)E''(y)$, where $E'(y)$ is composed of state abnormal events and $E''(y)$ is composed of state normal events, the following rules can be used to simplify a DUCG:

Rule 1: If $E(y)$ shows that $Z_{n;i}$ is false, $F_{n;i}$ is eliminated; if $E(y)$ shows that $Z_{n;i}$ is true, the conditional $F_{n;i}$ becomes the ordinary $F_{n;i}$, i.e. ---→ becomes ——→ 3.

Rule 2: If $E(y)$ shows that $V_{ij}$ ($V\in\{B, X\}$) is true while $V_{ij}$ is not a parent event of $X_n$ or $BX_n$, directed arc $F_{n;i}$ is eliminated.

Rule 3: If $E(y)$ shows that $X_{nk}$ is true while $X_{nk}$ cannot be caused by any state of $V_i$ ($V\in\{B, X, BX, G, D\}$), directed arc $F_{n;i}$ is eliminated.

Rule 4: If $E(y)$ shows that a state-unknown X-type node does not have any output and $E(y)$ blocks its connection with B-type nodes, eliminate this X-type node.

Rule 5: If $E(y)$ shows $X_{n0}$ is true, and $X_{n0}$ has no connection with B-type nodes unless through the nodes in $E(y)$, eliminate $X_{n0}$.

Rule 6: If $E(y)$ shows a group of state-unknown nodes that have no connection with $E'(y)$, this group of state-unknown nodes are eliminated.

Rule 7: Given $E(y)$, if $G_i$ has no output, eliminate $G_i$ and its input directed arc ——→; if $G_i$ has no input, eliminate $G_i$ and its output directed arcs.

Rule 8: Given $E(y)$, if a directed arc has no parent node or child node, eliminate this directed arc.

Rule 9: If there is a group of nodes and directed arcs that have no connection with $E'(y)$, this group of nodes and directed arcs are eliminated.

Rule 10: If $E(y)$ shows $X_{nk}$ ($k\neq0$) is true while $X_{nk}$ does not have any input, add a virtual parent event $D_n$ to $X_{nk}$ as its input with $a_{nk;nD}=1$ and $a_{n'k;nD}=0$ ($k\neq k'$), where $r_{n;D}$ can be any value. The added virtual $D_n$ can be drawn as

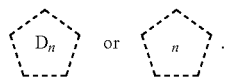

Rule 11: Apply Rule 1-Rule 10 in any order, separately or together, and repeatedly.

After applying the above rules, the DUCG is simplified, in which $H_{kj}=B_{kj}$ or $H_{kj}=BX_{kj}$ ($j\neq0$) compose $S_H(y)$.

In the simplified DUCG, some state-unknown X-type variables are cause-specific, which means that the state observation of a cause-specific X-type variable can determine whether the corresponding hypothesis event $H_{kj}$ ($H_{kj}\in S_H(y)$) is true.

Technical references for this invention

[1] Q. Zhang and Z. Zhang. Method for constructing an intelligent system processing uncertain causal relationship information. Chinese patent: CN 200680055266.X, 2010.

[2] Q. Zhang and Z. Zhang. Method for constructing an intelligent system processing uncertain causal relationship information. U.S. Pat. No. 8,255,353 B2, 2012.

[3] Q. Zhang and C. Dong. Method for constructing cubic DUCG for dynamic fault diagnosis. Chinese patent: CN 2013107185964, 2015.

[4] Q. Zhang. "Dynamic uncertain causality graph for knowledge representation and reasoning: discrete DAG cases", Journal of Computer Science and Technology, vol. 27, no. 1, pp. 1-23, 2012.

[5] Q. Zhang, C. Dong, Y. Cui and Z. Yang. "Dynamic uncertain causality graph for knowledge representation and probabilistic reasoning: statistics base, matrix and fault diagnosis", IEEE Trans. Neural Networks and Learning Systems, vol. 25, no. 4, pp. 645-663, 2014.

[6] Q. Zhang. "Dynamic uncertain causality graph for knowledge representation and probabilistic reasoning: directed cyclic graph and joint probability distribution", IEEE Trans. Neural Networks and Learning Systems, vol. 26, no. 7, pp. 1503-1517, 2015.

[7] Q. Zhang. "Dynamic uncertain causality graph for knowledge representation and probabilistic reasoning: continuous variable, uncertain evidence and failure forecast", IEEE Trans. Systems, Man and Cybernetics, vol. 45, no. 7, pp. 990-1003, 2015.

[8] Q. Zhang and S. Geng. "Dynamic uncertain causality graph applied to dynamic fault diagnosis of large and complex systems", IEEE Trans. Reliability, vol. 64, no. 3, pp 910-927, 2015.

[9] Q. Zhang and Z. Zhang. "Dynamic uncertain causality graph applied to dynamic fault diagnoses and predictions with negative feedbacks", IEEE Trans. Reliability, vol. 65, no. 2, pp 1030-1044, 2016.

SUMMARY OF THE INVENTION

This invention discloses a technical scheme to rank the state-unknown X-type variables optimally, so that people can optically choose the state-unknown X-type variables to detect (state pending X-type variables) to obtain $E^+(y)$. Conditional on $E(y+1)=E^+(y)E(y)$, the more accurate $S_H(y+1)$ and more accurate $Pr\{H_{kj}\}$, $H_{kj}\in S_H(y+1)$, can be found as earlier and with less cost as possible, while the danger degrees of $H_{kj}$ are considered.

This invention is a subsequent invention and a further development of granted patents CN 200680055266.X, CN 2013107185964, and U.S. Pat. No. 8,255,353 B2. The technical scheme of this invention comprises:

1. The method to rank the state pending X-type variables with at least one CPU, according to the rank, part of or all of the state pending X-type variables' states which form $E^+(y)$ are detected sequentially or parallel, in order to find the real cause $H_{kj}$ that is in $S_H(y+1)$ and to rank the real $H_{kj}$ as high as possible conditioned on $E(y+1)=E^+(y)E(y)$, detailed steps include: (1) determine the detectable state pending X-type variables whose index set is denoted as $S_X(y)$ based on the simplified DUCG conditioned on $E(y)$;

(2) the ranking ends if $S_X(y)$ contains only one element; (3) calculate the rank importance $I_i(y)$ of $X_i$; (4) rank $X_i$ ($i \in S_X(y)$) according to $I_i(y)$ and detect the states of $X_i$ ($i \in S_X(y)$) in reference to the rank; (5) if the ranking is still needing, increase y to y+1, and repeat the above step (1)-(5) until the diagnosis is satisfied or no state pending X-type variable available.

2. The method according to 1, wherein to determine the state pending X-type variables with at least one CPU, the detailed steps include: (1) Collect all possible $H_{kj}$ based on the simplified DUCG conditioned on $E(y)$, these $H_{kj}$ form $S_H(y)$; (2) For each $H_k$ in $S_H(y)$, search for the state pending X-type variable connected to $H_k$ without state-known variables blocking them, where the indices of such X-type variables make up $S_X(y)$.

3. The method according to 1, wherein to determine the structure importance $\lambda_i(y)>0$ of $X_i$ for calculating $I(y)$ with at least one CPU, characterized in that: for the state pending X-type variables in the above 1(1), count the number of its connected different $H_k$ ($k \in S_{iK}$) in $S_H(y)$ determined in the above 2, the number is written as $m_i(y)$, calculate $\lambda_i(y)$ based on $m_i(y)$ according to a method that features at that the bigger $m_i(y)$ is, the smaller $\lambda_i(y)$ is, such method includes but not limits to $\lambda_i(y) = 1/(m_i(y))^n$ (n=1, 2, ...).

4. The method according to 1, wherein assign a value to the danger importance $\omega_{kj}>0$ of $H_{kj}$ for calculating $I_i(y)$ with at least one CPU, characterized in that:

For each possible cause event $H_{kj}$ in $S_H(y)$, score all of the abnormal states according to their degree of concern, the score is called concern importance which is written as $\omega_k$, $1 \geq \omega_k > 0$. The greater the concern is, the bigger $\omega_k$ is. The value of $\omega_k$ can be assigned when constructing DUCG or be assigned according to the concrete situation given $H_k$ when $S_H(y)$ is known.

5. The method according to 1, wherein to calculate the probability importance $\rho_i(y)$ for calculating $I(y)$ with at least one CPU, characterized in that: calculate the average variation of the conditional probabilities of $H_k$ in $S_H(y)$ between the conditions $E(y)$ and $X_{ig}E(y)$ over all abnormal states of all $H_k$ connected with X without state-known variables blocking them, where $g \in S_{iG}(y)$, $S_{iG}(y)$ is the index set of possible states of $X_i$, and $X_i$ is non-cause-specific state pending X-type variables, based on the simplified DUCG conditioned on $E(y)$, featuring at that the greater the average variation is, the bigger $\rho_i(y)$ is, such as but are not limited to:

$$\rho_i(y) = \frac{1}{m_i(y)} \sum_{k \in S_{iK}(y)} \omega_k \sum_{j \in S_{kJ}(y)} \sum_{g \in S_{iG}(y)} Pr\{X_{ig} | E(y)\} |$$

$$Pr\{H_{kj} | X_{ig}E(y)\} - Pr\{H_{kj} | E(y)\}|$$

Or $$\rho_i(y) = \frac{1}{m_i(y)} \sum_{k \in S_{iK}(y)} \omega_k$$

$$\sqrt{\sum_{j \in S_{kJ}(y)} \sum_{g \in S_{iG}(y)} (Pr\{X_{ig} | E(y)\}(Pr\{H_{kj} | X_{ig}E(y)\} - Pr\{H_{kj} | E(y)\}))^2}$$

Or $$\rho_i(y) = \frac{1}{m_i(y)} \sum_{k \in S_{iK}(y)} \omega_k \sum_{j \in S_{kJ}(y)} \sum_{g \in S_{iG}(y)} | Pr\{H_{kj} | X_{ig}E(y)\} - Pr\{H_{kj} | E(y)\}|$$

Or $$\rho_i(y) = \frac{1}{m_i(y)} \sum_{k \in S_{iK}(y)} \omega_k \sqrt{\sum_{j \in S_{kJ}(y)} \sum_{g \in S_{iG}(y)} (Pr\{H_{kj} | X_{ig}E(y)\} - Pr\{H_{kj} | E(y)\})^2}$$

Or $$\rho_i(y) = \frac{1}{m_i(y)} \sum_{k \in S_{iK}(y)} \omega_k |$$

$$\sum_{g \in S_{iG}(y)} Pr\{H_{kj} | X_{ig}E(y)\} - \frac{1}{m_i} \sum_{k \in S_{iK}(y), j \in S_{kJ}(y)} \sum_{g \in S_{iG}(y)} Pr\{H_{kj} | X_{ig}E(y)\} |$$

$E(y)$ and $\omega_k$ can be ignored, equivalent to being removed separately or together, that is to let $E(y)$ = the complete set and $\omega_k = 1$.

6. The method according to 1 for calculating $I(y)$ with at least one CPU, wherein to determine the cost importance, characterized in that: comprehensively assign a cost score for the state pending $X_i$ ($i \in S_X(y)$), or calculate the cost score as the sum of the weighted scores assigned for the difficulty of doing the detection (indexed by j=1), waiting time (indexed by j=2), price (indexed by j=3) and damage to target system (indexed by j=4) respectively, the weights $\sigma_{ij}$ can be given when constructing DUCG or be given in an individual application, the bigger the cost score is, the smaller the cost importance $\beta_i$ ($1 \geq \beta_i > 0$) is, which including but not limited to: when the highest cost score is 100, $\beta_i = 1/100 = 0.01$, when the lowest cost score is 1, $\beta_i = 1/1 = 1$, and the remnant values are between the highest and the lowest case, can be assigned when constructing DUCG or be given online for the state pending X-type variables included in the simplified DUCG conditioned on $E(y)$.

7. The method according to 5 to determine the probability importance $\rho_i(y)$ with at least one CPU, characterized in that: based on the simplified DUCG conditioned on $E(y)$, for each cause-specific state pending X-type variable connected to $H_{kj}$ ($H_{kj} \in S_k(y)$), $\lambda_i(y)$ and $\rho_i(y)$ are not calculated according to the above 3 and 5, which means $S_{Xs}(y)$ is obtained by subtracting $S_s(y)$ from $S_X(y)$, but are calculated by selecting the maximum of $i \in S_s(y)$, which includes but is not limited to $\lambda_i(y) \geq 1$ and $$\rho_i(y) \geq \max_{l \in S_{Xs}(y)} \{\rho_l(y)\},$$

that means $X_i$ in the above 5 is limited to $i \in S_{Xs}(y)$.

8. The method according to 1 to comprehensively calculate $I(y)$ with at least one CPU, characterized in that: the bigger $\lambda_i(y)$ or $\rho_i(y)$ or $\beta_i$ in the above 2-7 is, the bigger $I_i(y)$ is, the detailed calculation formulas include but are not limited to:

$$I_i(y) = \frac{\lambda_i(y)\beta_i\rho_i(y)}{\sum_{i \in S_X(y)} \lambda_i(y)\beta_i\rho_i(y)}$$

Or $$I_i(y) = \lambda_i(y)\beta_i\rho_i(y)$$

Or

-continued $$I_i(y) = \frac{\lambda_i(y)\rho_i(y)}{\sum_{i \in S_X(y)} \lambda_i(y)\rho_i(y)}$$

Or $$I_i(y) = \lambda_i(y)\rho_i(y)$$

Or $$I_i(y) = \frac{\beta_i \rho_i(y)}{\sum_{i \in S_X(y)} \beta_i \rho_i(y)}$$

Or $$I_i(y) = \beta_i \rho_i(y)$$

Or $$I_i(y) = \frac{\rho_i(y)}{\sum_{i \in S_X(y)} \rho_i(y)}$$

Or $$I_i(y) = \rho_i(y)$$

Or $$I_i(y) = w_1 \lambda_i(y) + w_2 \rho_i(y) + w_3 \beta_i$$

Or $$I_i(y) = \frac{w_1 \lambda_i(y) + w_2 \rho_i(y) + w_3 \beta_i}{\sum_{i \in S_X(y)} w_1 \lambda_i(y) + w_2 \rho_i(y) + w_3 \beta_i}$$

where $w_1$, $w_2$, and $w_3$ are three weights, and $w_i \geq 0$ (i=1, 2, 3), and $w_i=0$ means this item is not considered, wherein the value of $w_1$, $w_2$, and $w_3$ can be assigned when constructing DUCG or be assigned according to the individual application situation.

9. The method according to 1 to rank the state pending X-type variables $X_i$ ($i \in S_X(y)$) according to $I_i(y)$ with at least one CPU, characterized in that: in the ranking, when the top-ranking X-type variable is the only ancestor or descendant variable of the ranking lower X-type variable, the ranking lower X-type variable is eliminated from the current rank, also the $X_i$ whose $I_i(y)=0$ is eliminated from the rank.

10. The method according to 1 to determine whether the ranking ends or not with at least one CPU, characterized in that: the ranking ends if there is only one hypothesis event in $S_H(y)$, or if all the state pending X-type variables are state-known, or there is only one element in $S_X(y)$.

The chart of the above steps is as shown in FIG. 3.

EXAMPLES TO IMPLEMENT THIS INVENTION

Figure 1:
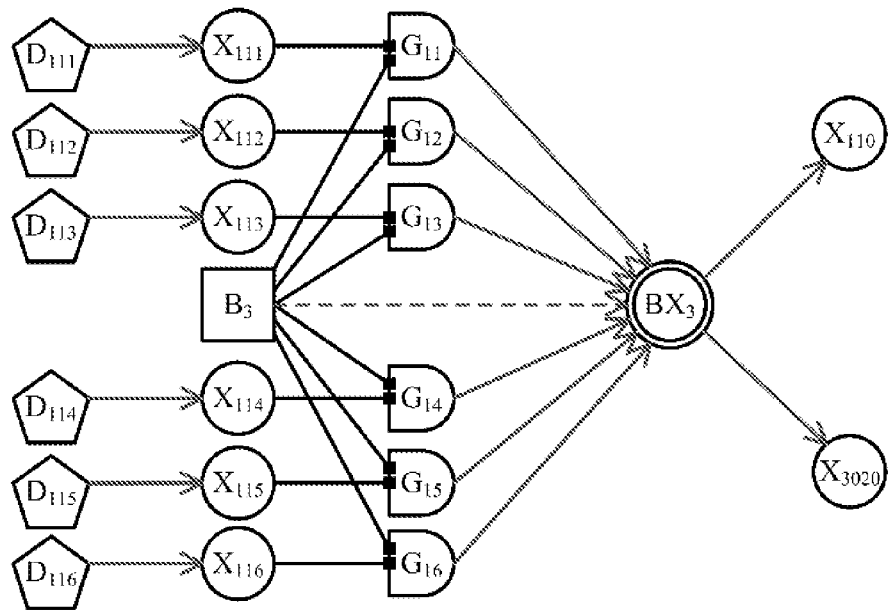
FIG. 1: Illustration of DUCG.
Figure 2:
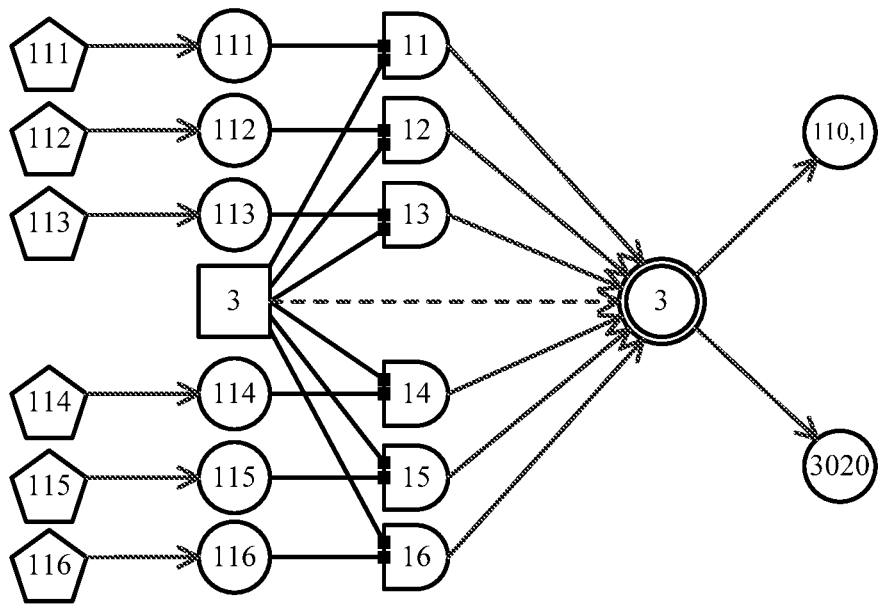
FIG. 2: Illustration of a simple representation of DUCG.
Figure 3:
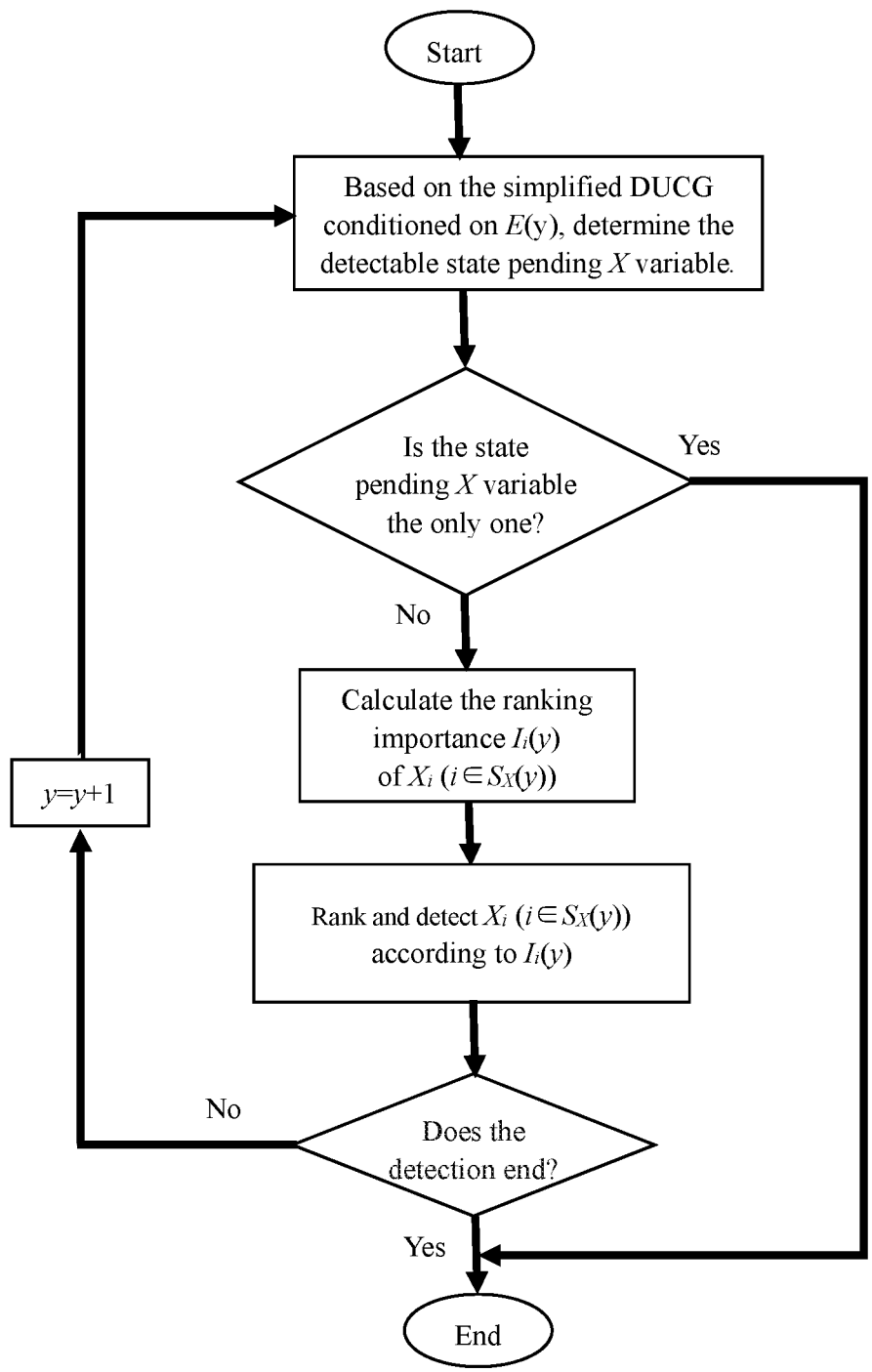
FIG. 3: Step chart of this invention.
Figure 4:
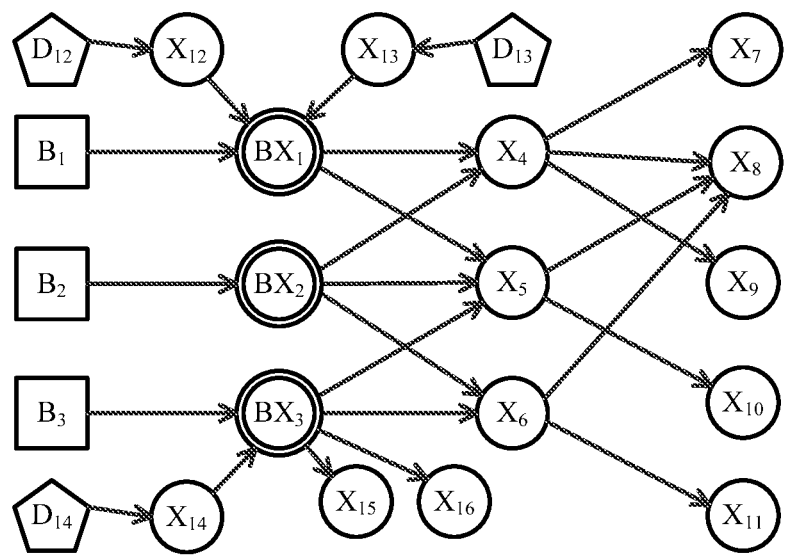
FIG. 4: The original DUCG of the examples.

Suppose FIG. 4 is the original DUCG graph whose parameters are as follows:

$$b_1 = (- \quad 0.08)^T; b_2 = (- \quad 0.01 \quad 0.02)^T;$$

$$b_3 = (- \quad 0.05)^T; a_{1;1} = \begin{pmatrix} - & - \\ - & 1 \end{pmatrix};$$

$$a_{2;2} = \begin{pmatrix} - & - & - \\ - & 1 & - \\ - & - & 1 \end{pmatrix}; a_{3;3} = \begin{pmatrix} - & - \\ - & 1 \end{pmatrix};$$

$$a_{12;D} = \begin{pmatrix} - \\ 0.1 \end{pmatrix}; a_{13;D} = \begin{pmatrix} - \\ 0.01 \end{pmatrix}; a_{14;D} = \begin{pmatrix} - \\ 0.1 \end{pmatrix};$$

$$a_{1;12} = \begin{pmatrix} - & - \\ - & 0.7 \end{pmatrix}; a_{1;13} = \begin{pmatrix} - & - \\ - & 0.8 \end{pmatrix}; a_{3;14} = \begin{pmatrix} - & - \\ - & 0.6 \end{pmatrix}; a_{4;1} = \begin{pmatrix} - & - \\ - & 0.9 \end{pmatrix};$$

$$a_{4;2} = \begin{pmatrix} - & - & - \\ - & 0.5 & 0.5 \end{pmatrix}; a_{5;1} = \begin{pmatrix} - & - \\ - & 0.7 \end{pmatrix};$$

$$a_{5;2} = \begin{pmatrix} - & - & - \\ - & 0.4 & 0.8 \end{pmatrix}; a_{5;3} = \begin{pmatrix} - & - \\ - & 0.7 \end{pmatrix};$$

$$a_{6;2} = \begin{pmatrix} - & - & - \\ - & 0.6 & 0.3 \\ - & 0.4 & 0.7 \end{pmatrix}; a_{6;3} = \begin{pmatrix} - & - \\ - & 0.2 \\ - & 0.8 \end{pmatrix};$$

$$a_{7;4} = \begin{pmatrix} - & - \\ - & 0.7 \end{pmatrix}; a_{8;4} = \begin{pmatrix} - & - \\ - & 0.8 \end{pmatrix};$$

$$a_{8;5} = \begin{pmatrix} - & - \\ - & 0.7 \end{pmatrix}; a_{8;6} = \begin{pmatrix} - & - & - \\ - & 0.2 & 0.8 \end{pmatrix};$$

$$a_{9;4} = \begin{pmatrix} - & - \\ - & 0.7 \end{pmatrix}; a_{10;5} = \begin{pmatrix} - & - \\ - & 0.7 \end{pmatrix};$$

$$a_{11;6} = \begin{pmatrix} - & - & - \\ - & 0.3 & 0.8 \end{pmatrix}; a_{15;3} = \begin{pmatrix} - & - \\ - & 1 \end{pmatrix}; a_{16;3} = \begin{pmatrix} - & - \\ - & 1 \end{pmatrix};$$

$r_{n;i}=1$ are assumed. Among all the X-type variables, $X_{14}$ is a non-detectable variable; other X-type variables are all detectable. $X_{15}$ and $X_{16}$ are cause-specific variables of $BX_{3,1}$, that is when $X_{15,1}$ or $X_{16,1}$ is true, $BX_{3,1}$ must be true. Since $\{B_{1,1}, B_{2,1}, B_{2,2}, B_{3,1}\}$ is equivalent to $\{BX_{1,1}, BX_{2,1}, BX_{2,2}, BX_{3,1}\}$, the B-type variables are not treated as the diagnosis object. In other words, H-type events are composed of only BX-type events.

The parameter of the directed arc between $X_n$ and $D_n$ can be briefly written as $a_{n;D}$. Our task is to detect the states of the state pending X-type variables as few and with less cost as possible, in order to minimize the size of the possible set of cause events $S_H(y)$ and to maximize the probability of real cause event.

Example 1: y=0 (with No Evidence)

According to 2, when there is no evidence (y=0), based on FIG. 4, $S_H(0)=\{H_{1,1}, H_{2,1}, H_{2,2}, H_{3,1}\}=\{BX_{1,1}, BX_{2,1},$ $BX_{2,2}$, $BX_{3,1}$}, and the state pending X-type variables are {$X_4$, $X_5$, $X_6$, $X_7$, $X_8$, $X_9$, $X_{10}$, $X_{11}$, $X_{12}$, $X_{13}$, $X_{15}$, $X_{16}$}. All these states are unknown and single-connect to $H_k$ in $S_H(0)$ without state-known blocking variables, so that $S_X(0)=\{4, 5, 6, 7, 8, 9, 10, 11, 12, 13, 15, 16\}$. Since $X_{15}$ and $X_{16}$ are cause-specific variables of $BX_{3,1}$, they are eliminated from $S_X(0)$, that means $S_{Xs}(0)=\{4, 5, 6, 7, 8, 9, 10, 11, 12, 13\}$. Accordingly, $S_{4G}(0)=S_{5G}(0)=S_{7G}(0)=S_{8G}(0)=S_{9G}(0)=S_{10G}(0)=S_{11G}(0)=S_{12G}(0)=S_{13G}(0)=\{1\}$ and $S_{6G}(0)=\{1, 2\}$.

Figure 5:
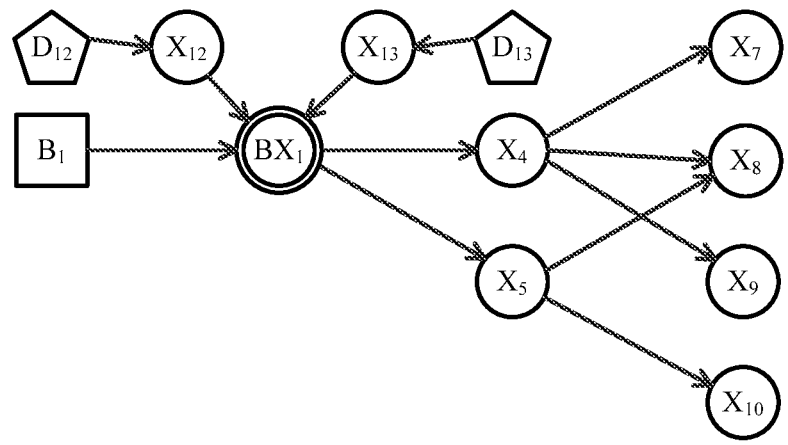
FIG. 5: The results of dividing and simplifying FIG. 4 based on $BX_1$ when y=0.
Figure 6:
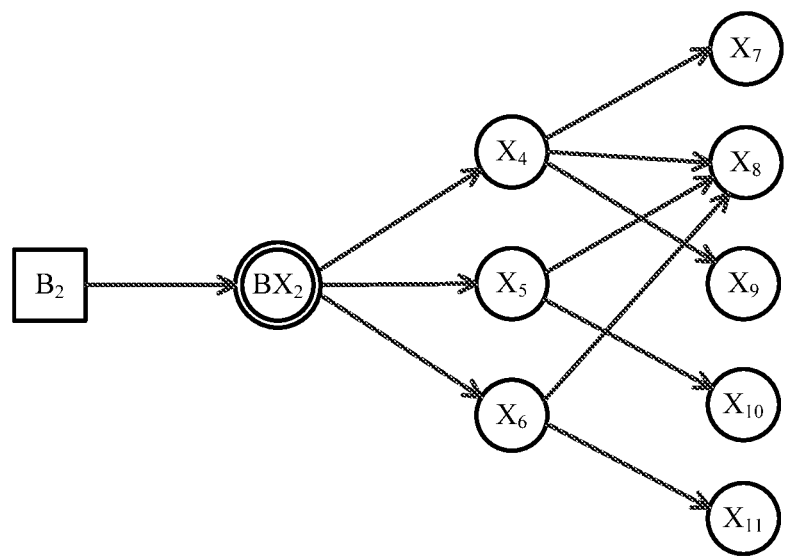
FIG. 6: The results of dividing and simplifying FIG. 4 based on $BX_2$ when y=0.
Figure 7:
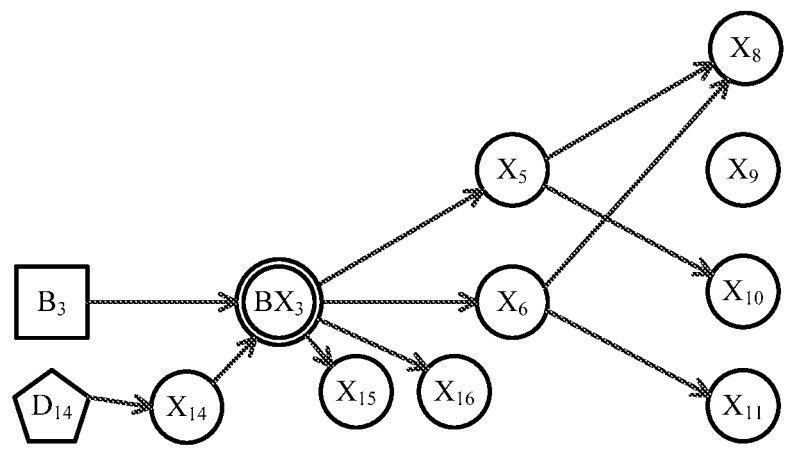
FIG. 7: The results of dividing and simplifying FIG. 4 based on $BX_3$ when y=0.

Based on FIG. 4, according to the DUCG algorithms in Ref [8], since the intersection of different $H_{kj}$ is null set, which means different $H_{kj}$ cannot occur simultaneously, FIG. 4 can be divided according to $H_k$ and can be simplified according to simplification rules, the results are shown in FIG. 5-FIG. 7.

Since there is no evidence, $E(0)=1$ (complete set), the probability and weighting factor of each sub-graph are $\zeta_i(y)=\zeta_i(0)=Pr\{E(0)\}=1$ ($i\in\{1,2,3\}$) and $$\xi_i(y) = \xi_i(0) = \zeta_i(0)\Big/\sum_i \zeta_i(0) = \frac{1}{3}\xi_i(y) = \xi_i(0) = \zeta_i(0)\Big/\sum_i \zeta_i(0) = \frac{1}{3}.$$

Based on FIG. 5-FIG. 7, according to algorithms in the references, the state probabilities $h_{kj}^s(y)=h_{kj}^s(0)$ of $BX_{1,1}$, $BX_{2,1}$, $BX_{2,2}$ and $BX_{3,1}$ are:

$$\begin{aligned}h_{1,1}^s(0) &= \xi_1(0)Pr\{BX_{1,1} \mid E(0)\} \\ &= \xi_1(0)Pr\{BX_{1,1}\} \\ &= \xi_1(0)Pr\Big\{\frac{r_{1;1}}{r_1}A_{1,1;1}B_1 + \frac{r_{1;12}}{r_1}A_{1,1;12}A_{12;D} + \frac{r_{1;13}}{r_1}A_{1,1;13}A_{13;D}\Big\} \\ &= \frac{1}{3}\times\frac{1}{3}a_{1,1;1}b_1 + \frac{1}{3}a_{1,1;12}a_{12;D} + \frac{1}{3}a_{1,1;13}a_{13;D} \\ &= \frac{1}{3}\times\frac{1}{3}(-\ 1\ )\binom{-}{0.08} + \frac{1}{3}(-\ 0.7\ )\binom{-}{0.1} + \frac{1}{3}(-\ 0.8\ )\binom{-}{0.01} \\ &= 0.01756\end{aligned}$$

$$\begin{aligned}h_{2,1}^s(0) &= \xi_2(0)Pr\{BX_{2,1}\} \\ &= \xi_2(0)Pr\{A_{2,1;2}B_2\} \\ &= \xi_2(0)a_{2,1;2}b_2 \\ &= \frac{1}{3}(-\ 1\ -)(-\ 0.01\ \ 0.02\ )^T \\ &= 0.003333\end{aligned}$$

$$\begin{aligned}h_{2,2}^s(0) &= \xi_2(0)Pr\{BX_{2,2}\} \\ &= \xi_2(0)Pr\{A_{2,2;2}B_2\} \\ &= \xi_2(0)a_{2,2;2}b_2 \\ &= \frac{1}{3}(-\ -\ 1\ )(-\ 0.01\ \ 0.02\ )^T \\ &= 0.006667\end{aligned}$$

$$\begin{aligned}h_{3,1}^s(0) &= \xi_3(0)Pr\{BX_{3,1}\} \\ &= \xi_3(0)Pr\Big\{\frac{r_{3;3}}{r_3}A_{3,1;3}B_3 + \frac{r_{3;14}}{r_3}A_{3,1;14}A_{14;D}\Big\} \\ &= \frac{1}{3}\times\frac{1}{2}a_{3,1;3}b_3 + \frac{1}{2}a_{3,1;14}a_{14;D} \\ &= \frac{1}{3}\times\frac{1}{2}(-\ 1\ )\binom{-}{0.05} + \frac{1}{2}(-\ 0.6\ )\binom{-}{0.1} \\ &= 0.01833\end{aligned}$$

The calculation result of rank probability $$h_{kj}^r(y) = \frac{h_{kj}^s(y)}{\sum_{H_{kj}\in S_H(y)} h_{kj}^s(y)}$$

is as follows:

| index | $H_{kj}$ | $h_{kj}^r(0)$ |
|---|---|---|
| 1 | $BX_{3,1}$ | 0.3995 |
| 2 | $BX_{1,1}$ | 0.3826 |
| 3 | $BX_{2,2}$ | 0.1453 |
| 4 | $BX_{2,1}$ | 0.0725 |

According to 3, based on FIG. 4, one can get $S_{12K}(0)=S_{13K}(0)=\{1\}$, and $S_{4K}(0)S_{7K}(0)S_{9K}(0)=\{1,2\}$, and $S_{6K}(0)=S_{11K}(0)=\{2,3\}$, and $S_{5K}(0)=S_{8K}(0)=S_{10K}(0)=\{1,2,3\}$. Accordingly, one can get $m_{12}(0)=m_{13}(0)=1$, and $m_4(0)=m_6(0)=m_7(0)=m_9(0)=m_{11}(0)=2$, and $m_5(0)=m_8(0)=m_{10}(0)=3$. Since $BX_1$ and $BX_3$ have only one abnormal state indexed by "1", thus $S_{1,J}(0)=S_{3,J}(0)=\{1\}$. And $BX_2$ has two abnormal states indexed by "1" and "2", thus $S_{2,J}(0)=\{1,2\}$.

According to 4, assume $\omega_{kj}=1$ ($k\in\{1,2,3\}$).

According to 5, with the following formula:

$$\rho_i(y) = \frac{1}{m_i'(y)}\sum_{k\in S_{iK}(y)}\sum_{j\in S_{kJ}(y)}\omega_{kj}\sum_{g\in S_{iG}(y)}|Pr\{X_{ig} \mid E(y)\}|$$

$$|Pr\{H_{kj} \mid X_{ig}E(y)\} - Pr\{H_{kj} \mid E(y)\}|$$

where $i\in S_{Xs}(0)=\{4, 5, 6, 7, 8, 9, 10, 11, 12, 13\}$ and $m_i'(y)=m_i(y)$. Based on FIG. 4, since $\omega_{kj}=1$, $k\in\{1,2,3\}$, thus $$\begin{aligned}\rho_4(0) &= \frac{1}{m_4(0)}\sum_{k\in\{1,2\}}\sum_{j\in S_{kJ}(0)}\sum_{g\in\{1\}}|Pr\{X_{ig} \mid E(0)\}| \\ &\quad |Pr\{H_{kj} \mid X_{ig}E(0)\} - Pr\{H_{kj} \mid E(0)\}| \\ &= \frac{1}{2}Pr\{X_{4,1}\}\begin{pmatrix}|Pr\{H_{1,1}|X_{4,1}\} - Pr\{H_{1,1}\}| \\ +|Pr\{H_{2,1}|X_{4,1}\} - Pr\{H_{2,1}\}| \\ +|Pr\{H_{2,2} \mid X_{4,1}\} - Pr\{H_{2,2}\}|\end{pmatrix} \\ &= \frac{1}{2}Pr\{X_{4,1}\}\begin{pmatrix}|Pr\{BX_{1,1} \mid X_{4,1}\} - Pr\{BX_{1,1}\}| \\ +|Pr\{BX_{2,1} \mid X_{4,1}\} - Pr\{BX_{2,1}\}| \\ +|Pr\{BX_{2,2} \mid X_{4,1}\} - Pr\{BX_{2,2}\}|\end{pmatrix} \\ &= \frac{1}{2}\begin{pmatrix}|Pr\{BX_{1,1}X_{4,1}\} - Pr\{X_{4,1}\}Pr\{BX_{1,1}\}| \\ +|Pr\{BX_{2,1}X_{4,1}\} - Pr\{X_{4,1}\}Pr\{BX_{2,1}\}| \\ +|Pr\{BX_{2,2}X_{4,1}\} - Pr\{X_{4,1}\}Pr\{BX_{2,2}\}|\end{pmatrix} \\ &= \frac{1}{2}\begin{pmatrix}\Big|Pr\Big\{BX_{1,1}\Big(\frac{r_{4;1}}{r_4}A_{4,1;1}BX_1 + \frac{r_{4;2}}{r_4}A_{4,1;2}BX_2\Big)\Big\| \\ -Pr\{X_{4,1}\}Pr\{BX_{1,1}\}\Big| \\ +\Big|Pr\Big\{BX_{2,1}\Big(\frac{r_{4;1}}{r_4}A_{4,1;1}BX_1 + \frac{r_{4;2}}{r_4}A_{4,1;2}BX_2\Big)\Big\| \\ -Pr\{X_{4,1}\}Pr\{BX_{2,1}\}\Big| \\ +\Big|Pr\Big\{BX_{2,2}\Big(\frac{r_{4;1}}{r_4}A_{4,1;1}BX_1 + \frac{r_{4;2}}{r_4}A_{4,1;2}BX_2\Big)\Big\| \\ -Pr\{X_{4,1}\}Pr\{BX_{2,2}\}\Big|\end{pmatrix} \\ &= \frac{1}{2}\begin{pmatrix}|Pr\{A_{4,1;1,1}BX_{1,1}\} - Pr\{X_{4,1}\}Pr\{BX_{1,1}\}| \\ +|Pr\{A_{4,1;2,1}BX_{2,1}\} - Pr\{X_{4,1}\}Pr\{BX_{2,1}\}| \\ +|Pr\{A_{4,1;2,2}BX_{2,2}\} - Pr\{X_{4,1}\}Pr\{BX_{2,2}\}|\end{pmatrix}\end{aligned}$$

$$= \frac{1}{2}\begin{pmatrix} |(Pr\{A_{4,1;1,1}\} - Pr\{X_{4,1}\})Pr\{BX_{1,1}\}| \\ + |(Pr\{A_{4,1;2,1}\} - Pr\{X_{4,1}\})Pr\{BX_{2,1}\}| \\ + |(Pr\{A_{4,1;2,2}\} - Pr\{X_{4,1}\})Pr\{BX_{2,2}\}| \end{pmatrix}$$

In which $$Pr\{X_{4,1}\} = Pr\left\{ \frac{r_{4;1}}{r_4}A_{4,1;1} + \begin{pmatrix} \frac{r_{1;1}}{r_1}A_{1;1}B_1 \\ + \frac{r_{1;12}}{r_1}A_{1;12}A_{12;D} \\ + \frac{r_{1;13}}{r_1}A_{1;13}A_{13;D} \end{pmatrix} + \frac{r_{4;2}}{r_4}A_{4,1;2}BX_2 \right\}$$

$$= Pr\left\{ \frac{1}{2}A_{4,1;1} + \begin{pmatrix} \frac{1}{3}A_{1;1}B_1 \\ + \frac{1}{3}A_{1;12}A_{12;D} \\ + \frac{1}{3}A_{1;13}A_{13;D} \end{pmatrix} + \frac{1}{2}A_{4,1;2}A_{2;2}B_2 \right\}$$

$$= \frac{1}{2}a_{4,1;1} + \begin{pmatrix} \frac{1}{3}a_{1;1}b_1 \\ + \frac{1}{3}a_{1;12}a_{12;D} \\ + \frac{1}{3}a_{1;13}a_{13;D} \end{pmatrix} + \frac{1}{2}a_{4,1;2}a_{2;2}b_2$$

$$= \frac{1}{2}(- \quad 0.9) + \begin{pmatrix} \frac{1}{3}\begin{pmatrix} - & - \\ - & 1 \end{pmatrix}\begin{pmatrix} - \\ 0.08 \end{pmatrix} \\ + \frac{1}{3}\begin{pmatrix} - & - \\ - & 0.7 \end{pmatrix}\begin{pmatrix} - \\ 0.1 \end{pmatrix} \\ + \frac{1}{3}\begin{pmatrix} - & - \\ - & 0.8 \end{pmatrix}\begin{pmatrix} - \\ 0.01 \end{pmatrix} \end{pmatrix} + \frac{1}{2}(- \quad 0.5 \quad 0.5)\begin{pmatrix} - & - & - \\ - & 1 & - \\ - & - & 1 \end{pmatrix}\begin{pmatrix} - \\ 0.01 \\ 0.02 \end{pmatrix}$$

$$= 0.0312$$

Thus:

$$\rho_4(0) = \frac{1}{2}\begin{pmatrix} |(a_{4,1;1,1} - Pr\{X_{4,1}\})Pr\{BX_{1,1}\}| \\ + |(a_{4,1;2,1} - Pr\{X_{4,1}\})Pr\{BX_{2,1}\}| \\ + |(a_{4,1;2,2} - Pr\{X_{4,1}\})Pr\{BX_{2,2}\}| \end{pmatrix}$$

$$= \frac{1}{2}\begin{pmatrix} |(0.9 - 0.0312)0.05267| \\ + |(0.5 - 0.0312)0.01| \\ + |(0.5 - 0.0312)0.02| \end{pmatrix} = 0.0299$$

Similarly, $$\rho_5(0) = \frac{1}{m_5(0)}\sum_{k \in \{1,2,3\}}\sum_{j \in S_{k,J}(0)}\sum_{g \in \{1\}} Pr\{X_{ig}|E(0)\}|Pr\{H_{kj}|X_{ig}E(0)\} - Pr\{H_{kj}|E(0)\}|$$

$$= \frac{1}{3}Pr\{X_{5,1}\}\begin{pmatrix} |Pr\{BX_{1,1}|X_{5,1}\} - Pr\{BX_{1,1}\}| \\ + |Pr\{BX_{2,1}|X_{5,1}\} - Pr\{BX_{2,1}\}| + |Pr\{BX_{2,2}|X_{5,1}\} \\ - Pr\{BX_{2,2}\}| + |Pr\{BX_{3,1}|X_{5,1}\} - Pr\{BX_{3,1}\}| \end{pmatrix}$$

$$= 0.030331$$

$$\rho_6(0) = \frac{1}{m_6(0)}\sum_{k \in \{2,3\}}\sum_{j \in S_{k,J}(0)}\sum_{g \in \{1,2\}} Pr\{X_{ig}|E(0)\}|Pr\{H_{kj}|X_{ig}E(0)\} - Pr\{H_{kj}|E(0)\}|$$

$$= \frac{1}{2}Pr\{X_{6,1}\}\begin{pmatrix} |Pr\{BX_{2,1}|X_{6,1}\} - Pr\{BX_{2,1}\}| + |Pr\{BX_{2,2}|X_{6,1}\} - Pr\{BX_{2,2}\}| + |Pr\{BX_{3,1}|X_{6,1}\} - Pr\{BX_{3,1}\}| \end{pmatrix}$$

$$+ \frac{1}{2}Pr\{X_{6,2}\}\begin{pmatrix} |Pr\{BX_{2,1}|X_{6,2}\} - Pr\{BX_{2,1}\}| + |Pr\{BX_{2,2}|X_{6,2}\} - Pr\{BX_{2,2}\}| + |Pr\{BX_{3,1}|X_{6,2}\} - Pr\{BX_{3,1}\}| \end{pmatrix}$$

$$= 0.040694$$

$$\rho_7(0) = \frac{1}{m_7(0)}\sum_{k \in \{1,2\}}\sum_{j \in S_{k,J}(0)}\sum_{g \in \{1\}} Pr\{X_{ig}|E(0)\}|Pr\{H_{kj}|X_{ig}E(0)\} - Pr\{H_{kj}|E(0)\}|$$

$$= \frac{1}{2}Pr\{X_{7,1}\}\begin{pmatrix} |Pr\{BX_{1,1}|X_{7,1}\} - Pr\{BX_{1,1}\}| \\ + |Pr\{BX_{2,1}|X_{7,1}\} - Pr\{BX_{2,1}\}| \\ + |Pr\{BX_{2,2}|X_{7,1}\} - Pr\{BX_{2,2}\}| \end{pmatrix}$$

$$= 0.020938$$

$$\rho_8(0) = \frac{1}{m_8(0)}\sum_{k \in \{1,2,3\}}\sum_{j \in S_{k,J}(0)}\sum_{g \in \{1\}} Pr\{X_{ig}|E(0)\}|Pr\{H_{kj}|X_{ig}E(0)\} - Pr\{H_{kj}|E(0)\}|$$

$$= \frac{1}{3}Pr\{X_{8,1}\}\begin{pmatrix} |Pr\{BX_{1,1}|X_{8,1}\} - Pr\{BX_{1,1}\}| \\ + |Pr\{BX_{2,1}|X_{8,1}\} - Pr\{BX_{2,1}\}| + |Pr\{BX_{2,2}|X_{8,1}\} \\ - Pr\{BX_{2,2}\}| + |Pr\{BX_{3,1}|X_{8,1}\} - Pr\{BX_{3,1}\}| \end{pmatrix}$$

$$= 0.01785$$

$$\rho_9(0) = \frac{1}{m_9(0)}\sum_{k \in \{1,2\}}\sum_{j \in S_{k,J}(0)}\sum_{g \in \{1\}} Pr\{X_{ig}|E(0)\}|Pr\{H_{kj}|X_{ig}E(0)\} - Pr\{H_{kj}|E(0)\}|$$

$$= \frac{1}{2}Pr\{X_{9,1}\}\begin{pmatrix} |Pr\{BX_{1,1}|X_{9,1}\} - Pr\{BX_{1,1}\}| \\ + |Pr\{BX_{2,1}|X_{9,1}\} - Pr\{BX_{2,1}\}| \\ + |Pr\{BX_{2,2}|X_{9,1}\} - Pr\{BX_{2,2}\}| \end{pmatrix}$$

$$= 0.020938$$

$$\rho_{10}(0) = \frac{1}{m_{10}(0)}\sum_{k \in \{1,2,3\}}\sum_{j \in S_{k,J}(0)}\sum_{g \in \{1\}} Pr\{X_{ig}|E(0)\}|Pr\{H_{kj}|X_{ig}E(0)\} - Pr\{H_{kj}|E(0)\}|$$

$$= \frac{1}{3}Pr\{X_{10,1}\}\begin{pmatrix} |Pr\{BX_{1,1}|X_{10,1}\} - Pr\{BX_{1,1}\}| \\ + |Pr\{BX_{2,1}|X_{10,1}\} - Pr\{BX_{2,1}\}| + |Pr\{BX_{2,2}|X_{10,1}\} \\ - Pr\{BX_{2,2}\}| + |Pr\{BX_{3,1}|X_{10,1}\} - Pr\{BX_{3,1}\}| \end{pmatrix}$$

$$= 0.021232$$

$$\rho_{11}(0) = \frac{1}{m_{11}(0)}\sum_{k \in \{2,3\}}\sum_{j \in S_{k,J}(0)}\sum_{g \in \{1\}} Pr\{X_{ig}|E(0)\}|Pr\{H_{kj}|X_{ig}E(0)\} - Pr\{H_{kj}|E(0)\}|$$

$$= \frac{1}{2}Pr\{X_{11,1}\}\begin{pmatrix} |Pr\{BX_{2,1}|X_{11,1}\} - Pr\{BX_{2,1}\}| + |Pr\{BX_{2,2}|X_{11,1}\} - Pr\{BX_{2,2}\}| + |Pr\{BX_{3,1}|X_{11,1}\} - Pr\{BX_{3,1}\}| \end{pmatrix}$$

$$= 0.027049$$

-continued $$\rho_{12}(0) = \frac{1}{m_{12}(0)} \sum_{k \in \{1\}} \sum_{j \in \{1\}} \sum_{g \in \{1\}} Pr\{X_{12g}|E(0)\}|Pr\{H_{kj}|X_{ig}E(0)\} - Pr\{H_{kj}|E(0)\}|$$

$$= \frac{1}{1} Pr\{X_{12,1}\}|Pr\{BX_{1,1}|X_{12,1}\} - Pr\{BX_{1,1}\}|$$

$$= 0.063$$

$$\rho_{13}(0) = \frac{1}{m_{13}(0)} \sum_{k \in \{1\}} \sum_{j \in \{1\}} \sum_{g \in \{1\}} Pr\{X_{13g}|E(0)\}|Pr\{H_{kj}|X_{ig}E(0)\} - Pr\{H_{kj}|E(0)\}|$$

$$= \frac{1}{1} Pr\{X_{13,1}\}|Pr\{BX_{1,1}|X_{13,1}\} - Pr\{BX_{1,1}\}|$$

$$= 0.00792$$

According to 7, take $$\rho_i(y) = \max_{l \in S_{X_s}(y)} \{\rho_l(y)\},$$

one can get the following:

$\rho_{15}(0) = \rho_{16}(0) = \max\{0.0299, 0.030331, 0.040694, 0.020938, 0.01785, 0.020838, 0.021232, 0.027049, 0.063, 0.00792\} = 0.063.$ And then:

| i | $\rho_i(0)$ |
|---|---|
| 4 | 0.0299 |
| 5 | 0.030331 |
| 6 | 0.040694 |
| 7 | 0.020938 |
| 8 | 0.01785 |
| 9 | 0.020938 |
| 10 | 0.021232 |
| 11 | 0.027049 |
| 12 | 0.063 |
| 13 | 0.00792 |
| 15 | 0.063 |
| 16 | 0.063 |

According to 6, let $\beta_i = 1/\alpha_i$ and assign their values as follows:

| i | $\alpha_i$ | $\beta_i$ |
|---|---|---|
| 4 | 100 | 0.01 |
| 5 | 2 | 0.5 |
| 6 | 50 | 0.02 |
| 7 | 1 | 1 |
| 8 | 2 | 0.5 |
| 9 | 2 | 0.5 |
| 10 | 2 | 0.5 |
| 11 | 1 | 1 |
| 12 | 1 | 1 |
| 13 | 1 | 1 |
| 15 | 1 | 1 |
| 16 | 1 | 1 |

According to 3, assume n=1, given $m_i(0)$, $\lambda_i(0)$ is calculated as follows:

| i | $m_i(0)$ | $\lambda_i(0)$ |
|---|---|---|
| 4 | 2 | 1/2 |
| 5 | 3 | 1/3 |
| 6 | 2 | 1/2 |
| 7 | 1 | 1 |
| 8 | 3 | 1/3 |
| 9 | 1 | 1 |
| 10 | 1 | 1 |
| 11 | 1 | 1 |
| 12 | 1 | 1 |
| 13 | 1 | 1 |
| 15 | 1 | 1 |
| 16 | 1 | 1 |

In which, according to 7, let $\lambda_{15}(0) = \lambda_{16}(0) = 1$.

According to 8, take $$I_i(y) = \frac{\lambda_i(y)\beta_i \rho_i(y)}{\sum_{i \in S_{X(y)}} \lambda_i(y)\beta_i \rho_i(y)},$$

we can obtain the following results:

$$I_4(0) = \frac{\lambda_4(0)\beta_4 \rho_4(0)}{\sum_{i \in \{4,\ldots,13,15,16\}} \lambda_i(0)\beta_i \rho_i(0)} = \frac{\frac{1}{2} \times 0.01 \times 0.0299}{0.27457861} = 0.000544$$

$$I_5(0) = \frac{\lambda_5(0)\beta_5 \rho_5(0)}{\sum_{i \in \{4,\ldots,13,15,16\}} \lambda_i(0)\beta_i \rho_i(0)} = \frac{\frac{1}{3} \times 0.5 \times 0.030331}{0.27457861} = 0.018411$$

$$I_6(0) = \frac{\lambda_6(0)\beta_6 \rho_6(0)}{\sum_{i \in \{4,\ldots,13,15,16\}} \lambda_i(0)\beta_i \rho_i(0)} = \frac{\frac{1}{2} \times 0.02 \times 0.040694}{0.27457861} = 0.001482$$

$$I_7(0) = \frac{\lambda_7(0)\beta_7 \rho_7(0)}{\sum_{i \in \{4,\ldots,13,15,16\}} \lambda_i(0)\beta_i \rho_i(0)} = \frac{1 \times 1 \times 0.020938}{0.27457861} = 0.076255$$

$$I_8(0) = \frac{\lambda_8(0)\beta_8 \rho_8(0)}{\sum_{i \in \{4,\ldots,13,15,16\}} \lambda_i(0)\beta_i \rho_i(0)} = \frac{\frac{1}{3} \times 0.5 \times 0.01785}{0.27457861} = 0.010835$$

$$I_9(0) = \frac{\lambda_9(0)\beta_9 \rho_9(0)}{\sum_{i \in \{4,\ldots,13,15,16\}} \lambda_i(0)\beta_i \rho_i(0)} = \frac{1 \times 0.5 \times 0.020938}{027457861} = 0.038128$$

$$I_{10}(0) = \frac{\lambda_{10}(0)\beta_{10} \rho_{10}(0)}{\sum_{i \in \{4,\ldots,13,15,16\}} \lambda_i(0)\beta_i \rho_i(0)} = \frac{1 \times 0.5 \times 0.021232}{0.27457861} = 0.038663$$

$$I_{11}(0) = \frac{\lambda_{11}(0)\beta_{11} \rho_{11}(0)}{\sum_{i \in \{4,\ldots,13,15,16\}} \lambda_i(0)\beta_i \rho_i(0)} = \frac{1 \times 1 \times 0.027049}{0.27457861} = 0.098511$$

-continued $$I_{12}(0) = \frac{\lambda_{12}(0)\beta_{12}\rho_{12}(0)}{\sum_{i\in\{4,\ldots,13,15,16\}} \lambda_i(0)\beta_i\rho_i(0)} = \frac{1\times1\times0.063}{0.27457861} = 0.229442$$

$$I_{13}(0) = \frac{\lambda_{13}(0)\beta_{13}\rho_{13}(0)}{\sum_{i\in\{4,\ldots,13,15,16\}} \lambda_i(0)\beta_i\rho_i(0)} = \frac{1\times1\times0.00792}{0.27457861} = 0.028844$$

$$I_{15}(0) = \frac{\lambda_{15}(0)\beta_{15}\rho_{15}(0)}{\sum_{i\in\{4,\ldots,13,15,16\}} \lambda_i(0)\beta_i\rho_i(0)} = \frac{1\times1\times0.063}{0.27457861} = 0.229442$$

$$I_{16}(0) = \frac{\lambda_{16}(0)\beta_{16}\rho_{16}(0)}{\sum_{i\in\{4,\ldots,13,15,16\}} \lambda_i(0)\beta_i\rho_i(0)} = \frac{1\times1\times0.063}{0.27457861} = 0.229442$$

According to 9, the ranking results of $X_i$ are:

| index | i | $I_i(0)$ |
| --- | --- | --- |
| 1 | 12 | 0.229442 |
| 2 | 15 | 0.229442 |
| 3 | 16 | 0.229442 |
| 4 | 11 | 0.098511 |
| 5 | 7 | 0.076255 |
| 6 | 10 | 0.038663 |
| 7 | 9 | 0.038128 |
| 8 | 13 | 0.028844 |
| 9 | 5 | 0.018411 |
| 10 | 8 | 0.010835 |
| 11 | 6 | 0.001482 |
| 12 | 4 | 0.000544 |

Take the first 5 X-type variables into detection. Assuming the detection results are $X_{7,1}$, $X_{11,0}$, $X_{12,1}$, $X_{15,0}$ and $X_{16,0}$, FIG. 4 changes as FIG. 8, in which, $X_{15}$ and $X_{16}$ are cause-specific variables for $BX_{3,1}$ and all the detection results are negative (variables are all at state 0), thus we know that the state of $BX_3$ is $BX_{3,0}$.

Figure 8:
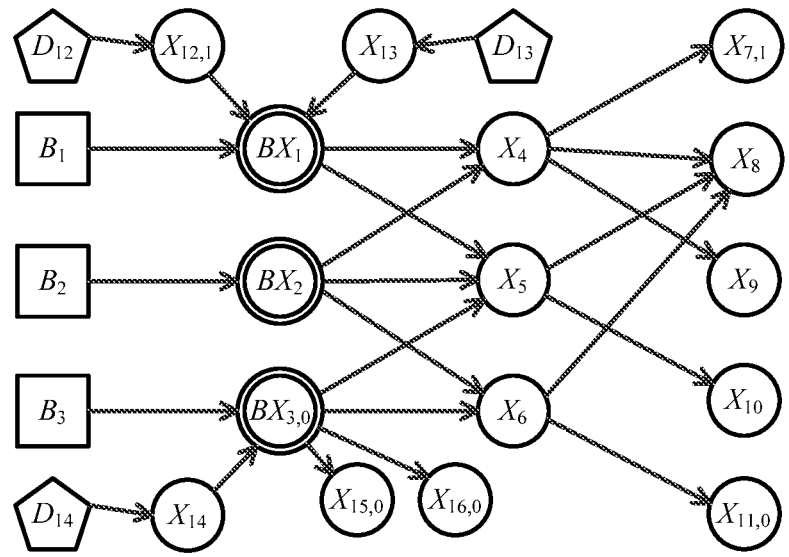
FIG. 8: The DUCG graph of example 1 after detecting the X-type variables ranking first 5.
Figure 9:
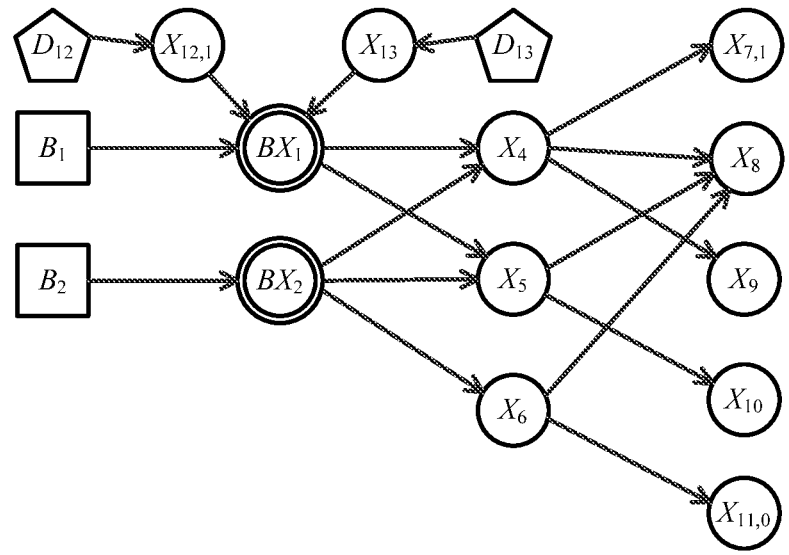
FIG. 9: The simplified DUCG when y=1.

According to the parameters in Example 1, FIG. 8 is simplified as FIG. 9 by using the aforementioned simplification rules 2, 3 and 5, and $E(1)=E^+(0)E(0)=E^+(0)=X_{7,1}X_{11,0}X_{12,1}$. Based on E(1) and similar to example 1, FIG. 9 can be divided and simplified as FIG. 10 and FIG. 11 according to the DUCG algorithms in [8].

Figure 10:
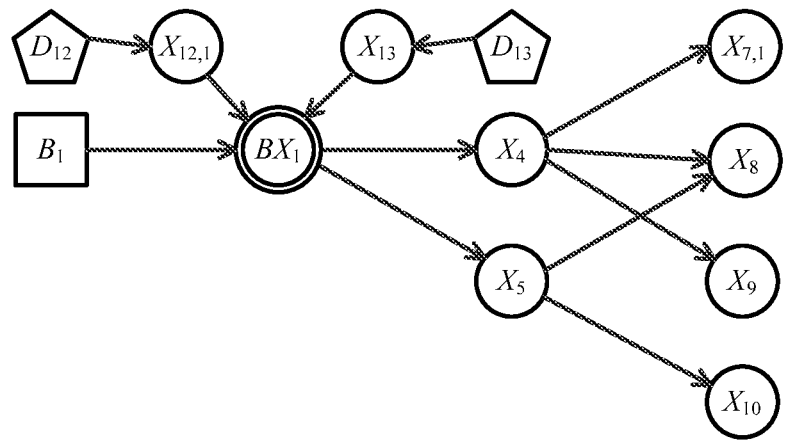
FIG. 10: The results of dividing and simplifying FIG. 9 based on $BX_1$ when y=1.

According to the algorithms in [4]-[9], calculate the probabilities $\zeta_i(y)=\zeta_i(1)$ of the sub-graph FIG. 9 and FIG. 10:

Based on FIG. 10, $$\zeta_1(1) = Pr\{E(1)\}$$

$$= Pr\{X_{7,1}X_{11,0}X_{12,1}\}$$

$$= Pr\{X_{7,1}X_{12,1}\}$$

$$= Pr\left\{\frac{r_{7;4}}{r_7}A_{7;1;4}\frac{r_{4;1}}{r_4}A_{4;1}BX_1X_{12,1}\right\}$$

$$= Pr\left\{\frac{1}{1}A_{7;1;4}\frac{1}{1}A_{4;1}\left(\frac{r_{1;1}}{r_1}A_{1;1}B_1 + \frac{r_{1;12}}{r_1}A_{1;12,1}X_{12,1}\right)X_{12,1}\right\}$$

$$= Pr\left\{A_{7;1;4}A_{4;1}\left(\frac{1}{2}A_{1;1}B_1 + \frac{1}{2}A_{1;12,1}\right)X_{12,1}\right\}$$

$$= Pr\left\{A_{7;1;4}A_{4;1}\left(\frac{1}{2}A_{1;1}B_1 + \frac{1}{2}A_{1;12,1}\right)A_{12,1;D}\right\}$$

$$= a_{7;1;4}a_{4;1}\left(\frac{1}{2}a_{1;1}b_1 + \frac{1}{2}a_{1;12,1}\right)a_{12,1;D}$$

$$= (-0.7)\begin{pmatrix} - & - \\ - & 0.9 \end{pmatrix}\left(\frac{1}{2}\begin{pmatrix} - & - \\ - & 1 \end{pmatrix}\begin{pmatrix} - \\ 0.08 \end{pmatrix} + \frac{1}{2}\begin{pmatrix} - \\ 0.7 \end{pmatrix}\right)0.1$$

$$= 0.02457$$

Figure 11:
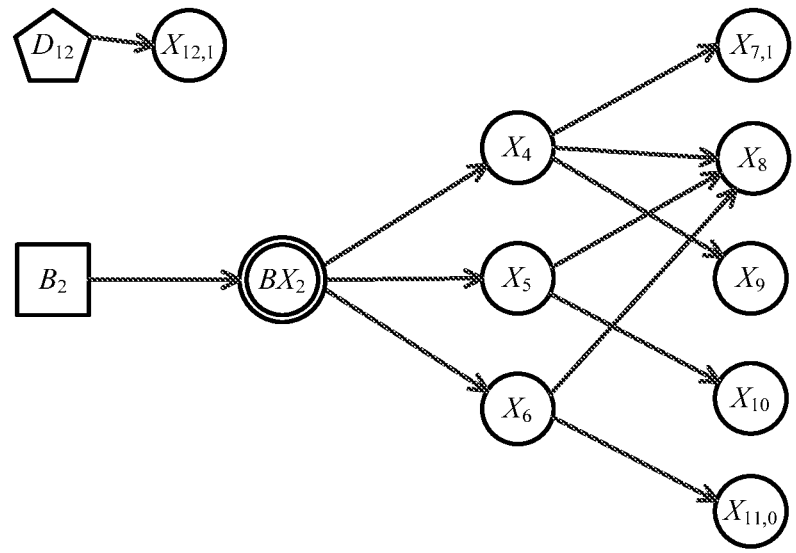
FIG. 11: The results of dividing and simplifying FIG. 9 based on $BX_2$ when y=2.

Based on FIG. 11, $$\zeta_2(1) = Pr\{E(1)\}$$

$$= Pr\{X_{7,1}X_{11,0}X_{12,1}\}$$

$$= Pr\left\{\left(\frac{r_{7;4}}{r_7}A_{7;1;4}\frac{r_{4;2}}{r_4}A_{4;2}BX_2\right)\left(\frac{r_{11;6}}{r_{11}}A_{11,0;6}\frac{r_{6;2}}{r_6}A_{6;2}BX_2\right)A_{12,1;D}\right\}$$

$$= Pr\left\{\left(\frac{1}{1}A_{7;1;4}\frac{1}{1}A_{4;2}\right)*\left(\frac{1}{1}A_{11,0;6}\frac{1}{1}A_{6;2}\right)A_{2;2}B_2A_{12,1;D}\right\}$$

$$= (a_{7;1;4}a_{4;2})*(a_{11,0;6}a_{6;2})a_{2;2}b_2a_{12,1;D}$$

$$= \left((-0.7)\begin{pmatrix} - & - & - \\ - & 0.5 & 0.5 \end{pmatrix}\right)*\begin{pmatrix} 1 & 1 & -0.3 & 1 & -0.8 \end{pmatrix}$$

$$\begin{pmatrix} - & - \\ - & 0.6 & 0.3 \\ - & 0.4 & 0.7 \end{pmatrix}\begin{pmatrix} - & - & - \\ - & 1 & - \\ - & - & 1 \end{pmatrix}\begin{pmatrix} - \\ 0.01 \\ 0.02 \end{pmatrix}0.1$$

$$= 0.00042$$

In which, the original parameter $a_{11,0;6}=(-\,-\,-)$ is modified as $a_{11,0;6}=(1\ 1-0.3\ 1-0.8)$, because $X_{11,0}$ is a negative evidence, which means none of the abnormal states occurs and $X_{11,0}=1-X_{11,1}$ according to [4].

According to the algorithms in [8], the weighting coefficients $$\xi_i(y) = \frac{\zeta_i(y)}{\sum_j \zeta_j(y)}$$

of the sub-graphs are:

$$\xi_1(1) = \frac{\zeta_1(1)}{\zeta_1(1)+\zeta_2(1)} = \frac{0.02457}{0.02457+0.00042} = 0.9832$$

$$\xi_2(1) = \frac{\zeta_2(1)}{\zeta_1(1)+\zeta_2(1)} = \frac{0.00042}{0.02457+0.00042} = 0.01681$$

According to 1 and based on the DUCG algorithms in [4]-[9], when y=0+1=1, the state probability $h_{kj}^s(y)=h_{kj}^s(1)$ of $H_{kj}$ is:

$$h_{1,1}^s(1) = \xi_1(1) Pr\{BX_{1,1} \mid E(1)\}$$

$$= \xi_1(1) Pr\{BX_{1,1} \mid X_{7,1} X_{11,0} X_{12,1}\}$$

$$= \xi_1(1) \frac{Pr\{BX_{1,1} X_{7,1} X_{11,0} X_{12,1}\}}{Pr\{X_{7,1} X_{11,0} X_{12,1}\}}$$

$$= 0.983193 \times \frac{0.00022932}{0.0003574}$$

$$= 0.983193 \times 0.64163$$

$$= 0.63085$$

In which $$Pr\{X_{7,1} X_{11,0} X_{12,1}\} = Pr\left\{\frac{r_{7;4}}{r_7} A_{7,1;4}\left(\frac{r_{4;1}}{r_4} A_{4;1} BX_1 + \frac{r_{4;2}}{r_4} A_{4;2} BX_2\right)\frac{r_{11;6}}{r_{11}} A_{11,0;6} \frac{r_{6;2}}{r_6} A_{6;2} BX_2 X_{12,1}\right\} =$$

$$Pr\left\{\begin{array}{l}\frac{r_{7;4}}{r_7} A_{7,1;4} \frac{r_{4;1}}{r_4} A_{4;1} BX_1 \frac{r_{11;6}}{r_{11}} A_{11,0;6} \frac{r_{6;2}}{r_6} A_{6;2} BX_2 X_{12,1} \\ + BX_{1,1}\left(\frac{r_{7;4}}{r_7} A_{7,1;4} \frac{r_{4;2}}{r_4} A_{4;2}\right) * \left(\frac{r_{11;6}}{r_{11}} A_{11,0;6} \frac{r_{6;2}}{r_6} A_{6;2}\right) BX_2 X_{12,1}\end{array}\right\} =$$

$$Pr\left\{\left(\begin{array}{l}\frac{r_{7;4}}{r_7} A_{7,1;4} \frac{r_{4;1}}{r_4} A_{4;1}\left(\begin{array}{l}\frac{r_{1;1}}{r_1} A_{1;1} B_1 \\ +\frac{r_{1;12}}{r_1} A_{1;12}\end{array}\right)\frac{r_{11;6}}{r_{11}} A_{11,0;6} \frac{r_{6;2}}{r_6} A_{6;2} \\ +\left(\frac{r_{7;4}}{r_7} A_{7,1;4} \frac{r_{4;2}}{r_4} A_{4;2}\right)*\left(\frac{r_{11;6}}{r_{11}} A_{11,0;6} \frac{r_{6;2}}{r_6} A_{6;2}\right)\end{array}\right)\frac{r_{2;2}}{r_2} A_{2;2} B_2 X_{12,1}\right\} =$$

$$\left(\left(\frac{r_{7;4}}{r_7} a_{7,1;4} \frac{r_{4;1}}{r_4} a_{4;1}\left(\begin{array}{l}\frac{r_{1;1}}{r_1} a_{1;1} b_{1,1} \\ +\frac{r_{1;12}}{r_1} a_{1,;12}\end{array}\right)\right)\left(\frac{r_{11;6}}{r_{11}} a_{11,0;6} \frac{r_{6;2}}{r_6} a_{6;2}\right) \right.\\ \left.+\left(\frac{r_{7;4}}{r_7} a_{7,1;4} \frac{r_{4;2}}{r_4} A_{4;2}\right)*\left(\frac{r_{11;6}}{r_{11}} a_{11,0;6} \frac{r_{6;2}}{r_6} a_{6;2}\right)\right) a_{2;2} b_2 a_{12,1;D} =$$

$$\left(\begin{array}{l}\left((-\ 0.7\ )\frac{1}{2}\left(\begin{array}{cc}- & - \\ - & 0.9\end{array}\right)\left(\frac{1}{2}\left(\begin{array}{cc}- & - \\ - & 1\end{array}\right)\left(\begin{array}{c}- \\ 0.08\end{array}\right)+\frac{1}{2}\left(\begin{array}{c}- \\ 0.08\end{array}\right)\right)\right) \cdot \left((1\ \ 1-0.3\ \ 1-0.8)\left(\begin{array}{ccc}- & - & - \\ - & 0.6 & 0.3 \\ - & 0.4 & 0.7\end{array}\right)\right) \\ +\left((-\ 0.7\ )\frac{1}{2}\left(\begin{array}{ccc}- & - & - \\ - & 0.5 & 0.5\end{array}\right)\right)*\left((1\ \ 1-0.3\ \ 1-0.8)\left(\begin{array}{ccc}- & - & - \\ - & 0.6 & 0.3 \\ - & 0.4 & 0.7\end{array}\right)\right)\end{array}\right)$$

$$\left(\begin{array}{ccc}- & - & - \\ - & 1 & - \\ - & - & 1\end{array}\right)\left(\begin{array}{c}- \\ 0.01 \\ 0.02\end{array}\right)0.1 =$$

$$(0.12285 \times (-\ 0.5\ \ 0.35\ ) + 0.39(-\ 0.175\ \ 0.175\ ))*(-\ 0.5\ \ 0.35\ ))\left(\begin{array}{c}- \\ 0.01 \\ 0.02\end{array}\right)0.1 =$$

$$(-\ 0.148925\ \ 0.104248\ )\left(\begin{array}{c}- \\ 0.01 \\ 0.02\end{array}\right)0.1 = 0.0003574$$

$$Pr\{BX_{1,1} X_{7,1} X_{11,0} X_{12,1}\} =$$

$$Pr\left\{BX_{1,1} \frac{r_{7;4}}{r_7} A_{7,1;4}\left(\frac{r_{4;1}}{r_4} A_{4;1} BX_1 + \frac{r_{4;2}}{r_4} A_{4;2} BX_2\right)\frac{r_{11;6}}{r_{11}} A_{11,0;6} \frac{r_{6;2}}{r_6} A_{6;2} BX_2 A_{12,1;D}\right\} =$$

$$Pr\left\{\begin{array}{l}\frac{r_{7;4}}{r_7} A_{7,1;4} \frac{r_{4;1}}{r_4} A_{4;1,1} BX_1 \frac{r_{11;6}}{r_{11}} A_{11,0;6} \frac{r_{6;2}}{r_6} A_{6;2} BX_2 A_{12,1;D} \\ + BX_{1,1}\left(\frac{r_{7;4}}{r_7} A_{7,1;4} \frac{r_{4;2}}{r_4} A_{4;2}\right)*\left(\frac{r_{11;6}}{r_{11}} A_{11,0;6} \frac{r_{6;2}}{r_6} A_{6;2}\right) BX_2 A_{12,1;D}\end{array}\right\} =$$

-continued $$Pr\left\{\left(\begin{array}{c}\frac{r_{7;4}}{r_7}A_{7,1;4}\frac{r_{4;1}}{r_4}A_{4;1,1}\left(\begin{array}{c}\frac{r_{1;1}}{r_1}A_{1,1;1,1}B_{1,1}\\+\frac{r_{1;12}}{r_1}A_{1,1;12}\end{array}\right)\frac{r_{11;6}}{r_{11}}A_{11,0;6}\frac{r_{6;2}}{r_6}A_{6;2}\\+\left(\begin{array}{c}\frac{r_{1;1}}{r_1}A_{1,1;1,1}B_{1,1}\\+\frac{r_{1;12}}{r_1}A_{1,1;12}\end{array}\right)\left(\frac{r_{7;4}}{r_7}A_{7,1;4}\frac{r_{4;2}}{r_4}A_{4;2}\right)*\left(\frac{r_{11;6}}{r_{11}}A_{11,0;6}\frac{r_{6;2}}{r_6}A_{6;2}\right)\end{array}\right)\frac{r_{2;2}}{r_2}A_{2;2}B_2A_{12,1;D}\right\}=$$

$$\left(\begin{array}{c}\left(\frac{r_{7;4}}{r_7}a_{7,1;4}\frac{r_{4;1}}{r_4}a_{4;1,1}\left(\begin{array}{c}\frac{r_{1;1}}{r_1}a_{1,1;1,1}b_{1,1}\\+\frac{r_{1;12}}{r_1}a_{1,1;12,1}\end{array}\right)\right)\left(\frac{r_{11;6}}{r_{11}}a_{11,0;6}\frac{r_{6;2}}{r_6}a_{6;2}\right)\\+\left(\begin{array}{c}\frac{r_{1;1}}{r_1}a_{1,1;1,1}b_{1,1}\\+\frac{r_{1;12}}{r_1}a_{1,1;12,1}\end{array}\right)\left(\frac{r_{7;4}}{r_7}a_{7,1;4}\frac{r_{4;2}}{r_4}a_{4;2}\right)*\left(\frac{r_{11;6}}{r_{11}}a_{11,0;6}\frac{r_{6;2}}{r_6}a_{6;2}\right)\end{array}\right)a_{2;2}b_2a_{12,1;D}=$$

$$\left\{\begin{array}{c}\left((-\ 0.7)\frac{1}{2}\left(\begin{array}{cc}-&-\\-&0.9\end{array}\right)\left(\frac{1}{2}\times0.08+\frac{1}{2}\times0.7\right)\right)\left(1\ \ 1-0.3\ \ 1-0.8\right)\left(\begin{array}{cc}-&-\\-&0.6&0.3\\-&0.4&0.7\end{array}\right)\\+\left(\frac{1}{2}\times0.08+\frac{1}{2}\times0.7\right)\left((-\ 0.7)\frac{1}{2}\left(\begin{array}{cc}-&-&-\\-&0.5&0.5\end{array}\right)\right)*\left(1\ \ 1-0.3\ \ 1-0.8\right)\left(\begin{array}{cc}-&-\\-&0.6&0.3\\-&0.4&0.7\end{array}\right)\end{array}\right\}\left(\begin{array}{c}-\\0.01\\0.02\end{array}\right)0.1=$$

$$(0.12285(-\ 0.5\ \ 0.35)+0.39(-\ 0.175\ \ 0.175)*(-\ 0.5\ \ 0.35))\left(\begin{array}{c}-\\0.01\\0.02\end{array}\right)0.1=$$

$$(-\ 0.09555\ \ 0.066885)\left(\begin{array}{c}-\\0.01\\0.02\end{array}\right)0.1=0.00022932$$

In the same way, $$h_{2,1}^s(1)=\xi_2(1)Pr\{BX_{2,1}\mid E(1)\}$$
$$=\xi_2(1)Pr\{BX_{2,1}\mid X_{7,1}X_{11,0}X_{12,1}\}$$
$$=0.007$$

$$h_{2,2}^s(1)=\xi_2(1)Pr\{BX_{2,2}\mid E(1)\}$$
$$=\xi_2(1)Pr\{BX_{2,2}\mid X_{7,1}X_{11,0}X_{12,1}\}$$
$$=0.009781$$

Based on $$h_{kj}^r(1)=\frac{h_{kj}^s(1)}{\sum_{H_{kj}\in S_H(1)}h_{kj}^s(1)},$$

the rank probabilities are:

| index | $H_{kj}$ | $h_{kj}^r(1)$ |
|---|---|---|
| 1 | $BX_{1,1}$ | 0.974089 |
| 2 | $BX_{2,2}$ | 0.015103 |
| 3 | $BX_{2,1}$ | 0.010809 |

Compared to the rank probabilities $h_{kj}^r(0)$ before detections, we see (1) $BX_{3,1}$ which ranks first is eliminated and the possible result is a reduced state space $S_H(1)$, and (2) the rank probability of $BX_{1,1}$ is far bigger than the rest two, which means that the cause of abnormality in the real target system can be verified as $BX_{1,1}$ with only five X-type variables being detected.

Example 2: y=1

According to 2, when no evidence (y=0), based on FIG. 4, $S_H(0)=\{H_{1,1}, H_{2,1}, H_{2,2}, H_{3,1}\}=\{BX_{1,1}, BX_{2,1}, BX_{2,2}, BX_{3,1}\}$, and the state pending X-type variables are $\{X_4, X_5, X_6, X_7, X_8, X_9, X_{10}, X_{11}, X_{12}, X_{13}, X_{15}, X_{16}\}$. All these states are unknown and single-connect to $H_k$ in $S_H(0)$ without state-known blocking variables, so that $S_X(0)=\{4, 5, 6, 7, 8, 9, 10, 11, 12, 13, 15, 16\}$. Since $X_{15}$ and $X_{16}$ are cause-specific variable for $BX_{3,1}$, they are eliminated from $S_X(0)$, that means $S_{Xs}(0)=\{4, 5, 6, 7, 8, 9, 10, 11, 12, 13\}$. Accordingly, $S_{4G}(0)=S_{5G}(0)=S_{7G}(0)=S_{8G}(0)=S_{9G}(0)=S_{10G}(0)=S_{11G}(0)=S_{12G}(0)=S_{13G}(0)=\{1\}$ and $S_{6G}(0)=\{1, 2\}$.

As example 1 and based on FIG. 9, $E(1)=X_{7,1}X_{11,0}X_{12,1}$, $S_H(1)=\{H_{1,1}, H_{2,1}, H_{2,2}\}=\{BX_{1,1}, BX_{2,1}, BX_{2,2}\}$ and the testing X variables are $\{X_4, X_5, X_6, X_8, X_9, X_{10}\}$. All of them are states unknown and single-connect to like $H_k \in \{BX_1, BX_2\}$ without state-known blocking variables. According to 9, $X_4$ is the only upstream variable of $X_{7,1}$ and can be eliminated from the ranking, thus $S_X(1)=\{5, 6, 8, 9, 10\}$. Since there is no cause-specific variable, then $S_{Xs}(1)=S_X(1)$. As the same as y=0, one can get $S_{4G}(1)=S_{5G}(1)=S_{8G}(1)=S_{9G}(1)=S_{10G}(1)=\{1\}$ and $S_{6G}(1)=\{1, 2\}$.

According to 3 and based on FIG. 9, one can get the following equations: $S_{13K}(1)=\{1\}$, $S_{4K}(1)=S_{5K}(1)=S_{8K}(1)=S_{9K}(1)=S_{10K}(1)=\{1,2\}$, and $S_{6K}(1)=\{2\}$; and accordingly $m_6(1)=1$, $m_4(1)=m_5(1)=m_8(1)=m_{10}(1)$ $m_9(1)=2$, $S_{1J}(1)=\{1\}$, and $S_{2J}(1)=\{2\}$. Still same as y=0, $\omega_{kj}=1$ ($k \in \{1,2\}$).

According to 5, take the following formula for calculation as same as in example 1:

$$\rho_i(y) = \frac{1}{m_i(y)} \sum_{k \in S_{iK}(y)} \sum_{j \in S_{kJ}(y)} \omega_{kj}$$
$$\sum_{g \in S_{iG}(y)} Pr\{X_{ig} \mid E(y)\} |Pr\{H_{kj} \mid X_{ig} E(y)\} - Pr\{H_{kj} \mid E(y)\}|$$

where $i \in S_{Xs}(0)=\{4, 5, 6, 8, 9, 10\}$. Note $m'_i(y)=m_i(y)$ in this example.

According to FIG. 9, since $\omega_{kj}=1$ and $k \in \{1, 2\}$, we have $$\rho_4(1) = \frac{1}{m_4(1)} \sum_{k \in \{1,2\}} \sum_{j \in S_{kJ}(1)} \sum_{g \in \{1\}} Pr\{X_{ig} \mid E(1)\} |Pr\{H_{kj} \mid X_{ig} E(1)\} - Pr\{H_{kj} \mid E(1)\}|$$

$$= \frac{1}{2} Pr\{X_{4,1} \mid E(1)\} \begin{pmatrix} |Pr\{H_{1,1} \mid X_{4,1} E(1)\} - Pr\{H_{1,1} \mid E(1)\}| \\ +|Pr\{H_{2,1} \mid X_{4,1} E(1)\} - Pr\{H_{2,1} \mid E(1)\}| \\ +|Pr\{H_{2,2} \mid X_{4,1} E(1)\} - Pr\{H_{2,2} \mid E(1)\}| \end{pmatrix}$$

$$= \frac{1}{2} Pr\{X_{4,1} \mid E(1)\} \begin{pmatrix} |Pr\{BX_{1,1} \mid X_{4,1} E(1)\} - Pr\{BX_{1,1} \mid E(1)\}| \\ +|Pr\{BX_{2,1} \mid X_{4,1} E(1)\} - Pr\{BX_{2,1} \mid E(1)\}| \\ +|Pr\{BX_{2,2} \mid X_{4,1} E(1)\} - Pr\{BX_{2,2} \mid E(1)\}| \end{pmatrix}$$

$$= \frac{1}{2} \frac{1}{Pr\{E(1)\}} \begin{pmatrix} |Pr\{BX_{1,1} X_{4,1} E(1)\} - Pr\{X_{4,1} E(1)\} Pr\{B_{1,1} \mid E(1)\}| \\ +|Pr\{BX_{2,1} X_{4,1} E(1)\} - Pr\{X_{4,1} E(1)\} Pr\{B_{2,1} \mid E(1)\}| \\ +|Pr\{BX_{2,2} X_{4,1} E(1)\} - Pr\{X_{4,1} E(1)\} Pr\{B_{2,2} \mid E(1)\}| \end{pmatrix}$$

In which $$Pr\{X_{4,1} E(1)\} = Pr\{X_{4,1} X_{7,1} X_{11,0} X_{12,1}\}$$

$$= Pr\left\{\frac{r_{7;4}}{r_7} A_{7,1;4} X_4 X_{4,1} X_{11,0} X_{12,1}\right\} = Pr\left\{\frac{r_{7;4}}{r_7} A_{7,1;4} X_{4,1} X_{11,0} X_{12,1}\right\}$$

$$= Pr\left\{\frac{r_{7;4}}{r_7} A_{7,1;4,1}\left(\frac{r_{4;1}}{r_4} A_{4,1;1} BX_1 + \frac{r_{4;2}}{r_4} A_{4,1;2} BX_2\right) \frac{r_{11;6}}{r_{11}} A_{11,0;6} \frac{r_{6;2}}{r_6} A_{6;2} BX_2 A_{12,1;D}\right\}$$

$$= Pr\left\{ \begin{array}{l} \frac{r_{7;4}}{r_7} A_{7,1;4,1} \frac{r_{4;1}}{r_4} A_{4,1;1} BX_1 \frac{r_{11;6}}{r_{11}} A_{11,0;6} \frac{r_{6;2}}{r_6} A_{6;2} BX_2 A_{12,1;D} \\ +\left(\frac{r_{7;4}}{r_7} A_{7,1;4,1} \frac{r_{4;2}}{r_4} A_{4,1;2}\right) * \left(\frac{r_{11;6}}{r_{11}} A_{11,0;6} \frac{r_{6;2}}{r_6} A_{6;2}\right) BX_2 A_{12,1;D} \end{array} \right\}$$

$$= Pr\left\{ \left( \begin{array}{l} \frac{r_{7;4}}{r_7} A_{7,1;4,1} \frac{r_{4;1}}{r_4} A_{4,1;1}\left(\begin{array}{l} \frac{r_{1;1}}{r_1} A_{1;1} B_1 \\ +\frac{r_{1;12}}{r_1} A_{1;12} \end{array}\right) \frac{r_{11;6}}{r_{11}} A_{11,0;6} \frac{r_{6;2}}{r_6} A_{6;2} \\ +\left(\frac{r_{7;4}}{r_7} A_{7,1;4,1} \frac{r_{4;2}}{r_4} A_{4,1;2}\right) * \left(\frac{r_{11;6}}{r_{11}} A_{11,0;6} \frac{r_{6;2}}{r_6} A_{6;2}\right) \end{array} \right) \frac{r_{2;2}}{r_2} A_{2;2} B_2 A_{12,1;D} \right\}$$

$$= \left( \begin{array}{l} \left(\frac{r_{7;4}}{r_7} a_{7,1;4,1} \frac{r_{4;1}}{r_4} a_{4,1;1}\left(\begin{array}{l} \frac{r_{1;1}}{r_1} a_{1;1} b_1 \\ +\frac{r_{1;12}}{r_1} a_{1;12} \end{array}\right)\right)\left(\frac{r_{11;6}}{r_{11}} a_{11,0;6} \frac{r_{6;2}}{r_6} a_{6;2}\right) \\ +\left(\frac{r_{7;4}}{r_7} a_{7,1;4,1} \frac{r_{4;2}}{r_4} a_{4,1;2}\right) * \left(\frac{r_{11;6}}{r_{11}} a_{11,0;6} \frac{r_{6;2}}{r_6} a_{6;2}\right) \end{array} \right) a_{2;2} b_2 a_{12,1;D}$$

$$= \left( \begin{array}{l} \left(0.7 \frac{1}{2}(-\ 0.9)\left(\begin{array}{c} - \\ 0.39 \end{array}\right)\right)\left(\begin{pmatrix} 1 & 1 & -0.3 & 1 & -0.8 \end{pmatrix}\begin{pmatrix} - & - & - \\ - & 0.6 & 0.3 \\ - & 0.4 & 0.7 \end{pmatrix}\right) \\ +\left(0.7 \frac{1}{2}(-\ 0.5\ 0.5)\right) * \left(\begin{pmatrix} 1 & 1 & -0.3 & 1 & -0.8 \end{pmatrix}\begin{pmatrix} - & - & - \\ - & 0.6 & 0.3 \\ - & 0.4 & 0.7 \end{pmatrix}\right) \end{array} \right) \begin{pmatrix} - \\ 0.01 \\ 0.02 \end{pmatrix} 0.1$$

$$= 0.00035742$$

$Pr\{BX_{1,1}X_{4,1}E(1)\} = Pr\{BX_{1,1}X_{4,1}X_{7,1}X_{11,0}X_{12,1}\}$ $= Pr\left\{\dfrac{r_{7;4}}{r_7}A_{7,1;4}X_4X_{4,1}X_{11,0}X_{12,1}BX_{1,1}\right\} = Pr\left\{\dfrac{r_{7;4}}{r_7}A_{7,1;4}X_{4,1}X_{11,0}X_{12,1}BX_{1,1}\right\}$ $= Pr\left\{\dfrac{r_{7;4}}{r_7}A_{7,1;4,1}\left(\dfrac{r_{4;1}}{r_4}A_{4,1;1,1}BX_{1,1} + \dfrac{r_{4;2}}{r_4}A_{4,1;2}BX_2BX_{1,1}\right)\dfrac{r_{11;6}}{r_{11}}A_{11,0;6}\dfrac{r_{6;2}}{r_6}A_{6;2}BX_2A_{12,1;D}\right\}$ $= Pr\left\{\begin{array}{l}\dfrac{r_{7;4}}{r_7}A_{7,1;4,1}\dfrac{r_{4;1}}{r_4}A_{4,1;1,1}BX_{1,1}\dfrac{r_{11;6}}{r_{11}}A_{11,0;6}\dfrac{r_{6;2}}{r_6}A_{6;2}BX_2A_{12,1;D}\\ +\left(\dfrac{r_{7;4}}{r_7}A_{7,1;4,1}\dfrac{r_{4;2}}{r_4}A_{4,1;2}\right)*\left(\dfrac{r_{11;6}}{r_{11}}A_{11,0;6}\dfrac{r_{6;2}}{r_6}A_{6;2}\right)BX_2BX_{1,1}A_{12,1;D}\end{array}\right\}$ $= Pr\left\{\left(\begin{array}{l}\dfrac{r_{7;4}}{r_7}A_{7,1;4,1}\dfrac{r_{4;1}}{r_4}A_{4,1;1,1}\left(\begin{array}{l}\dfrac{r_{1;1}}{r_1}A_{1,1;1}B_1\\ +\dfrac{r_{1;12}}{r_1}A_{1,1;12}\end{array}\right)\dfrac{r_{11;6}}{r_{11}}A_{11,0;6}\dfrac{r_{6;2}}{r_6}A_{6;2}\\ +\left(\dfrac{r_{7;4}}{r_7}A_{7,1;4,1}\dfrac{r_{4;2}}{r_4}A_{4,1;2}\right)*\left(\dfrac{r_{11;6}}{r_{11}}A_{11,0;6}\dfrac{r_{6;2}}{r_6}A_{6;2}\right)\left(\begin{array}{l}\dfrac{r_{1;1}}{r_1}A_{1,1;1}B_1+\\ \dfrac{r_{1;12}}{r_1}A_{1,1;12}\end{array}\right)\end{array}\right)\dfrac{r_{2;2}}{r_2}A_{2;2}B_2A_{12,1;D}\right\}$ $= \left(\begin{array}{l}\left(\dfrac{r_{7;4}}{r_4}a_{7,1;4,1}\dfrac{r_{4;1}}{r_4}a_{4,1;1,1}\left(\begin{array}{l}\dfrac{r_{1;1}}{r_1}a_{1,1;1}b_1\\ +\dfrac{r_{1;12}}{r_1}a_{1,1;12}\end{array}\right)\right)\left(\dfrac{r_{11;6}}{r_{11}}a_{11,0;6}\dfrac{r_{6;2}}{r_6}a_{6;2}\right)\\ +\left(\dfrac{r_{7;4}}{r_7}a_{7,1;4,1}\dfrac{r_{4;2}}{r_4}A_{4,1;2}\right)*\left(\dfrac{r_{11;6}}{r_{11}}a_{11,0;6}\dfrac{r_{6;2}}{r_6}a_{6;2}\right)\left(\begin{array}{l}\dfrac{r_{1;1}}{r_1}a_{1,1;1}b_1+\\ \dfrac{r_{1;12}}{r_1}a_{1,1;12}\end{array}\right)\end{array}\right)a_{2;2}b_2a_{12,1;D}$ $= \left(\begin{array}{l}\left(0.7\dfrac{1}{2}0.9(0.39)\right)\left((1\quad 1-0.3\quad 1-0.8)\begin{pmatrix}-&-&-\\ -&0.6&0.3\\ -&0.4&0.7\end{pmatrix}\right)\\ +\left(0.7\dfrac{1}{2}(-\quad 0.5\quad 0.5)\right)*\left((1\quad 1-0.3\quad 1-0.8)\begin{pmatrix}-&-&-\\ -&0.6&0.3\\ -&0.4&0.7\end{pmatrix}\right)(0.39)\end{array}\right)\begin{pmatrix}-\\ 0.01\\ 0.02\end{pmatrix}0.1$ $= 0.0002293$ $Pr\{BX_{2,1}X_{4,1}E(1)\} = Pr\{BX_{2,1}X_{4,1}X_{7,1}X_{11,0}X_{12,1}\}$ $= Pr\left\{\dfrac{r_{7;4}}{r_7}A_{7,1;4}X_4X_{4,1}X_{11,0}X_{12,1}BX_{2,1}\right\} = Pr\left\{\dfrac{r_{7;4}}{r_7}A_{7,1;4}X_{4,1}X_{11,0}X_{12,1}BX_{2,1}\right\}$ $= Pr\left\{\dfrac{r_{7;4}}{r_7}A_{7,1;4}\left(\dfrac{r_{4;1}}{r_4}A_{4,1;1}BX_1 + \dfrac{r_{4;2}}{r_4}A_{4,1;2}BX_2\right)\dfrac{r_{11;6}}{r_{11}}A_{11,0;6}\dfrac{r_{6;2}}{r_6}A_{6;2}BX_2A_{12,1;D}BX_{2,1}\right\}$ $= Pr\left\{\begin{array}{l}\dfrac{r_{7;4}}{r_7}A_{7,1;4,1}\dfrac{r_{4;1}}{r_4}A_{4,1;1}BX_1\dfrac{r_{11;6}}{r_{11}}A_{11,0;6}\dfrac{r_{6;2}}{r_6}A_{6;2,1}BX_{2,1}A_{12,1;D}\\ +\left(\dfrac{r_{7;4}}{r_7}A_{7,1;4,1}\dfrac{r_{4;2}}{r_4}A_{4,1;2,1}\right)\left(\dfrac{r_{11;6}}{r_{11}}A_{11,0;6}\dfrac{r_{6;2}}{r_6}A_{6;2,1}\right)BX_{2,1}A_{112,1;D}\end{array}\right\}$ $= Pr\left\{\left(\begin{array}{l}\dfrac{r_{7;4}}{r_7}A_{7,1;4,1}\dfrac{r_{4;1}}{r_4}A_{4,1;1}\left(\begin{array}{l}\dfrac{r_{1;1}}{r_1}A_{1;1}B_1\\ +\dfrac{r_{1;12}}{r_1}A_{1;12}\end{array}\right)\dfrac{r_{11;6}}{r_{11}}A_{11,0;6}\dfrac{r_{6;2}}{r_6}A_{6;2,1}\\ +\left(\dfrac{r_{7;4}}{r_7}A_{7,1;4,1}\dfrac{r_{4;2}}{r_4}A_{4,1;2,1}\right)\left(\dfrac{r_{11;6}}{r_{11}}A_{11,0;6}\dfrac{r_{6;2}}{r_6}A_{6;2,1}\right)\end{array}\right)\dfrac{r_{2;2}}{r_2}A_{2,1;2}B_2A_{12,1;D}\right\}$ $= \left(\begin{array}{l}\left(\dfrac{r_{7;4}}{r_7}a_{7,1;4,1}\dfrac{r_{4;1}}{r_4}a_{4,1;1}\left(\begin{array}{l}\dfrac{r_{1;1}}{r_1}a_{1;1}b_1\\ +\dfrac{r_{1;12}}{r_1}a_{1;12}\end{array}\right)\right)\left(\dfrac{r_{11;6}}{r_{11}}a_{11,0;6}\dfrac{r_{6;2}}{r_6}a_{6;2,1}\right)\\ +\left(\dfrac{r_{7;4}}{r_7}a_{7,1;4,1}\dfrac{r_{4;2}}{r_4}A_{4,1;2,1}\right)\left(\dfrac{r_{11;6}}{r_{11}}a_{11,0;6}\dfrac{r_{6;2}}{r_6}a_{6;2,1}\right)\end{array}\right)a_{2,1;2}b_2a_{12,1;D}$ $$= \begin{pmatrix} \left(0.7\frac{1}{2}(-0.9)\begin{pmatrix} - \\ 0.39 \end{pmatrix}\right)\left((1 \quad 1-0.3 \quad 1-0.8)\begin{pmatrix} - \\ 0.6 \\ 0.4 \end{pmatrix}\right) \\ + \left(0.7\frac{1}{2}(0.5)\right)\left((1 \quad 1-0.3 \quad 1-0.8)\begin{pmatrix} - \\ 0.6 \\ 0.4 \end{pmatrix}\right) \end{pmatrix}(0.01)0.1$$

$$= 0.0001489$$

$$Pr\{BX_{2,2}X_{4,1}E(1)\} = Pr\{BX_{2,2}X_{4,1}X_{7,1}X_{11,0}X_{12,1}\}$$

$$= Pr\left\{\frac{r_{7;4}}{r_7}A_{7,1;4}X_4 X_{4,1}X_{11,0}X_{12,1}BX_{2,1}\right\} = Pr\left\{\frac{r_{7;4}}{r_7}A_{7,1;4}X_{4,1}X_{11,0}X_{12,1}BX_{2,2}\right\}$$

$$= Pr\left\{\frac{r_{7;4}}{r_7}A_{7,1;4,1}\left(\frac{r_{4;1}}{r_4}A_{4,1;1}BX_1 + \frac{r_{4;2}}{r_4}A_{4,1;2}BX_2\right)\frac{r_{11;6}}{r_{11}}A_{11,0;6}\frac{r_{6;2}}{r_6}A_{6;2}BX_2A_{12,1;D}BX_{2,2}\right\}$$

$$= Pr\left\{ \begin{array}{l} \frac{r_{7;4}}{r_7}A_{7,1;4,1}\frac{r_{4;1}}{r_4}A_{4,1;1}BX_1\frac{r_{11;6}}{r_{11}}A_{11,0;6}\frac{r_{6;2}}{r_6}A_{6;2,1}BX_{2,2}A_{12,1;D} \\ + \left(\frac{r_{7;4}}{r_7}A_{7,1;4,1}\frac{r_{4;2}}{r_4}A_{4,1;2,2}\right)*\left(\frac{r_{11;6}}{r_{11}}A_{11,0;6}\frac{r_{6;2}}{r_6}A_{6;2,2}\right)BX_{2,2}A_{12,1;D} \end{array} \right\}$$

$$= Pr\left\{ \begin{array}{l} \frac{r_{7;4}}{r_7}A_{7,1;4,1}\frac{r_{4;1}}{r_4}A_{4,1;1}\begin{pmatrix} \frac{r_{1;1}}{r_1}A_{1;1}B_1 \\ + \frac{r_{1;12}}{r_1}A_{1;12,1} \end{pmatrix}\frac{r_{11;6}}{r_{11}}A_{11,0;6}\frac{r_{6;2}}{r_6}A_{6;2,2} \\ + \left(\frac{r_{7;4}}{r_7}A_{7,1;4,1}\frac{r_{4;2}}{r_4}A_{4,1;2,2}\right)*\left(\frac{r_{11;6}}{r_{11}}A_{11,0;6}\frac{r_{6;2}}{r_6}A_{6;2,2}\right) \end{array} \right\}\frac{r_{2;2}}{r_2}A_{2,2;2}B_2 A_{12,1;D}$$

$$= \begin{pmatrix} \left(\frac{r_{7;4}}{r_7}a_{7,1;4,1}\frac{r_{4;1}}{r_4}a_{4,1;1}\begin{pmatrix} \frac{r_{1;1}}{r_1}a_{1;1}b_1 \\ + \frac{r_{1;12}}{r_1}a_{1;12,1} \end{pmatrix}\right)\left(\frac{r_{11;6}}{r_{11}}a_{11,0;6}\frac{r_{6;2}}{r_6}a_{6;2,2}\right) \\ + \left(\frac{r_{7;4}}{r_7}a_{7,1;4,1}\frac{r_{4;2}}{r_4}a_{4,1;2,2}\right)*\left(\frac{r_{11;6}}{r_{11}}a_{11,0;6}\frac{r_{6;2}}{r_6}a_{6;2,2}\right) \end{pmatrix}a_{2,2;2}b_2 a_{12,1;D}$$

$$= \begin{pmatrix} \left(0.7\frac{1}{2}(-0.9)\begin{pmatrix} - \\ 0.39 \end{pmatrix}\right)\left((1 \quad 1-0.3 \quad 1-0.8)\begin{pmatrix} - \\ 0.3 \\ 0.7 \end{pmatrix}\right) \\ + \left(0.7\frac{1}{2}(0.5)\right)*\left((1 \quad 1-0.3 \quad 1-0.8)\begin{pmatrix} - \\ 0.3 \\ 0.7 \end{pmatrix}\right) \end{pmatrix}(0.02)0.1$$

$$= 0.000208$$

Thus $$\rho_4(1) = \frac{1}{2}\frac{1}{Pr\{E(1)\}}\begin{pmatrix} |Pr\{BX_{1,1}X_{4,1}E(1)\} - Pr\{X_{4,1}E(1)\}Pr\{BX_{1,1} \mid E(1)\}| \\ + |Pr\{BX_{2,1}X_{4,1}E(1)\} - Pr\{X_{4,1}E(1)\}Pr\{BX_{2,1} \mid E(1)\}| \\ + |Pr\{BX_{2,2}X_{4,1}E(1)\} - Pr\{X_{4,1}E(1)\}Pr\{BX_{2,2} \mid E(1)\}| \end{pmatrix}$$

$$= \frac{1}{2}\frac{1}{0.0003574}\begin{pmatrix} |0.0002293 - 0.00035742 \times 0.64163| \\ + |0.0001489 - 0.00035742 \times 0.41662| \\ + |0.000208 - 0.00035742 \times 0.58286| \end{pmatrix}$$

$$= 0$$

Similarly, $$\rho_5(1) = \frac{1}{m_5(1)}\sum_{k \in \{1,2\}}\sum_{j \in S_{k,J}(1)}\sum_{g \in \{1\}} Pr\{X_{ig} \mid E(1)\}|Pr\{H_{kj} \mid X_{ig}E(1)\} - Pr\{H_{kj} \mid E(1)\}|$$

$$= \frac{1}{2}Pr\{X_{5,1} \mid E(1)\}\begin{pmatrix} |Pr\{BX_{1,1}X_{5,1}E(1)\} - Pr\{BX_{1,1} \mid E(1)\}| \\ + |Pr\{BX_{2,1}X_{5,1}E(1)\} - Pr\{BX_{2,1} \mid E(1)\}| \\ + |Pr\{BX_{2,2}X_{5,1}E(1)\} - Pr\{BX_{2,2} \mid E(1)\}| \end{pmatrix}$$

$$= 0.092519$$

-continued $$\rho_6(1) = \frac{1}{m_6(1)} \sum_{k \in \{2\}} \sum_{j \in S_{k,J}(1)} \sum_{g \in \{1,2\}} Pr\{X_{ig} \mid E(1)\} |Pr\{H_{kj} \mid X_{ig}E(1)\} - Pr\{H_{kj} \mid E(1)\}|$$

$$= \frac{1}{1} Pr\{X_{6,1} \mid E(1)\}(|Pr\{BX_{2,1}X_{6,1}E(1)\} - Pr\{BX_{2,1} \mid E(1)\}| + |Pr\{BX_{2,2}X_{6,1}E(1)\} - Pr\{BX_{2,2} \mid E(1)\}|)$$

$$+ \frac{1}{1} Pr\{X_{6,2} \mid E(1)\}(|Pr\{BX_{2,1}X_{6,2}E(1)\} - Pr\{BX_{2,1} \mid E(1)\}| + |Pr\{BX_{2,2}X_{6,2}E(1)\} - Pr\{BX_{2,2} \mid E(1)\}|)$$

$$= 0.233261$$

$$\rho_8(1) = \frac{1}{m_8(1)} \sum_{k \in \{1,2\}} \sum_{j \in S_{k,J}(1)} \sum_{g \in \{1\}} Pr\{X_{ig} \mid E(1)\} |Pr\{H_{kj} \mid X_{ig}E(1)\} - Pr\{H_{kj} \mid E(1)\}|$$

$$= \frac{1}{2} Pr\{X_{8,1} \mid E(1)\} \begin{pmatrix} |Pr\{BX_{1,1}X_{8,1}E(1)\} - Pr\{BX_{1,1} \mid E(1)\}| \\ + |Pr\{BX_{2,1}X_{8,1}E(1)\} - Pr\{BX_{2,1} \mid E(1)\}| \\ + |Pr\{BX_{2,2}X_{8,1}E(1)\} - Pr\{BX_{2,2} \mid E(1)\}| \end{pmatrix}$$

$$= 0.065047$$

$$\rho_9(1) = \frac{1}{m_9(1)} \sum_{k \in \{1,2\}} \sum_{j \in S_{k,J}(1)} \sum_{g \in \{1\}} Pr\{X_{ig} \mid E(1)\} |Pr\{H_{kj} \mid X_{ig}E(1)\} - Pr\{H_{kj} \mid E(1)\}|$$

$$= \frac{1}{2} Pr\{X_{9,1} \mid E(1)\} \begin{pmatrix} |Pr\{BX_{1,1}X_{9,1}E(1)\} - Pr\{BX_{1,1} \mid E(1)\}| \\ + |Pr\{BX_{2,1}X_{9,1}E(1)\} - Pr\{BX_{2,1} \mid E(1)\}| \\ + |Pr\{BX_{2,2}X_{9,1}E(1)\} - Pr\{BX_{2,2} \mid E(1)\}| \end{pmatrix}$$

$$= 0.000199$$

$$\rho_{10}(1) = \frac{1}{m_{10}(1)} \sum_{k \in \{1,2\}} \sum_{j \in S_{k,J}(1)} \sum_{g \in \{1\}} Pr\{X_{ig} \mid E(1)\} |Pr\{H_{kj} \mid X_{ig}E(1)\} - Pr\{H_{kj} \mid E(1)\}|$$

$$= \frac{1}{2} \frac{Pr\{X_{10,1} \mid E(1)\}}{Pr\{E(1)\}} \begin{pmatrix} |Pr\{BX_{1,1}X_{10,1}E(1)\} - Pr\{BX_{1,1} \mid E(1)\}| \\ + |Pr\{BX_{2,1}X_{10,1}E(1)\} - Pr\{BX_{2,1} \mid E(1)\}| \\ + |Pr\{BX_{2,2}X_{10,1}E(1)\} - Pr\{BX_{2,2} \mid E(1)\}| \end{pmatrix}$$

$$= 0.06229$$

The calculation results are listed in the following:

| i  | $\rho_i(1)$ |
|----|-------------|
| 4  | 0           |
| 5  | 0.092519    |
| 6  | 0.233261    |
| 8  | 0.065047    |
| 9  | 0.000199    |
| 10 | 0.06299     |

According to 6, the same as example 1, assume $\beta_i = 1/\alpha_i$ and the values are follows:

| i  | $\alpha_i$ | $\beta_i$ |
|----|------------|-----------|
| 4  | 100        | 0.01      |
| 5  | 2          | 0.5       |
| 6  | 50         | 0.02      |
| 8  | 2          | 0.5       |
| 9  | 2          | 0.5       |
| 10 | 2          | 0.5       |

Given $m_i(1)$, $\lambda_i(1)$ is calculated as follows:

| i  | $m_i(1)$ | $\lambda_i(1)$ |
|----|----------|----------------|
| 4  | 2        | 1/2            |
| 5  | 2        | 1/2            |
| 6  | 1        | 1/1            |
| 8  | 3        | 1/3            |
| 9  | 1        | 1              |
| 10 | 1        | 1              |

According to 8, take $$I_i(y) = \frac{\lambda_i(y)\beta_i\rho_i(y)}{\sum_{i \in S_{X(y)}} \lambda_i(y)\beta_i\rho_i(y)},$$

we can obtain the following results:

$$I_4(1) = \frac{\lambda_4(1)\beta_4\rho_4(1)}{\sum_{i \in \{4,\cdots,9,10\}} \lambda_i(1)\beta_i\rho_i(1)} = \frac{\frac{1}{2} \times 0.01 \times 0}{0.070231} = 0$$

$$I_5(1) = \frac{\lambda_5(1)\beta_5\rho_5(1)}{\sum_{i \in \{4,\cdots,9,10\}} \lambda_i(1)\beta_i\rho_i(1)} = \frac{\frac{1}{2} \times 0.5 \times 0.0231298}{0.070231} = 0.329338$$

-continued $$I_6(1) = \frac{\lambda_6(1)\beta_6\rho_6(1)}{\sum_{i\in\{4,\cdots,9,10\}}\lambda_i(1)\beta_i\rho_i(1)} = \frac{1\times 0.02\times 0.0046652}{0.070231} = 0.066427$$

$$I_8(1) = \frac{\lambda_8(1)\beta_8\rho_8(1)}{\sum_{i\in\{4,\cdots,9,10\}}\lambda_i(1)\beta_i\rho_i(1)} = \frac{\frac{1}{3}\times 0.5\times 0.010841}{0.070231} = 0.154363$$

$$I_9(1) = \frac{\lambda_9(1)\beta_9\rho_9(1)}{\sum_{i\in\{4,\cdots,9,10\}}\lambda_i(1)\beta_i\rho_i(1)} = \frac{1\times 0.5\times 0.0000995}{0.070231} = 0.001417$$

$$I_{10}(1) = \frac{\lambda_{10}(1)\beta_{10}\rho_{10}(1)}{\sum_{i\in\{4,\cdots,9,10\}}\lambda_i(1)\beta_i\rho_i(1)} = \frac{1\times 0.5\times 0.031495}{0.070231} = 0.448449$$

The ranking results are:

| index | i | $I_i(1)$ |
|---|---|---|
| 1 | 10 | 0.448449 |
| 2 | 5 | 0.329338 |
| 3 | 8 | 0.154363 |
| 4 | 6 | 0.066427 |
| 5 | 9 | 0.001417 |
| 6 | 4 | 0 |

According to 9, since $X_5$ is the only upstream variable of $X_{10}$, $X_5$ can be eliminated from the ranking. Since the rank probability of $X_4$ is equal to zero and there is no meaning to detect $X_4$, thus $X_4$ can be eliminated from the ranking. So the above ranking becomes:

| index | i | $I_i(1)$ |
|---|---|---|
| 1 | 10 | 0.448449 |
| 2 | 8 | 0.154363 |
| 3 | 6 | 0.066427 |
| 4 | 9 | 0.001417 |

Figure 12:
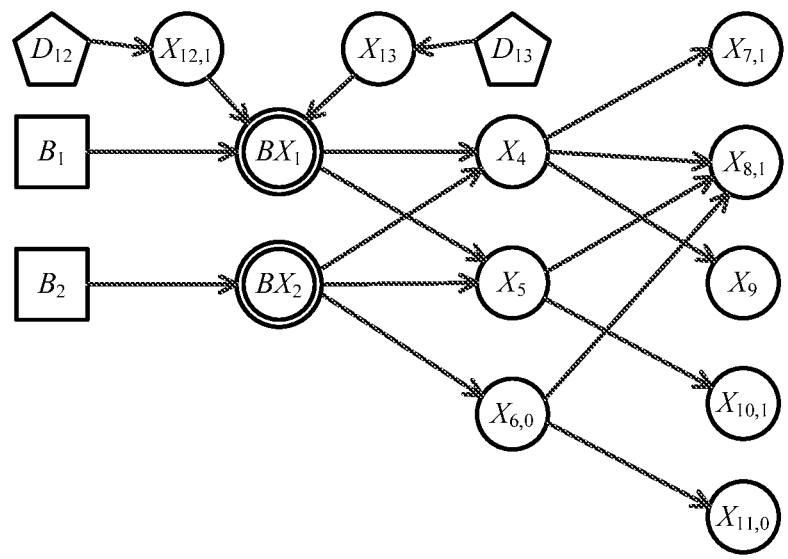
FIG. 12: The DUCG graph after detecting the states of $X_8$ and $X_{10}$.
Figure 13:
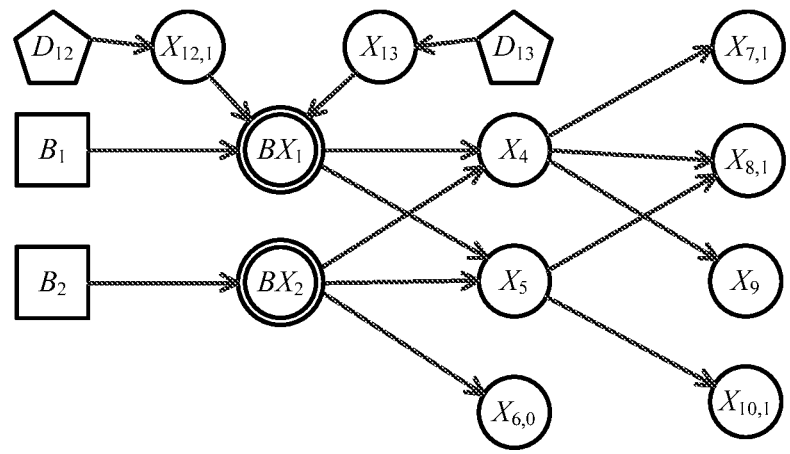
FIG. 13: The simplified DUCG graph given E(2).
Figure 14:
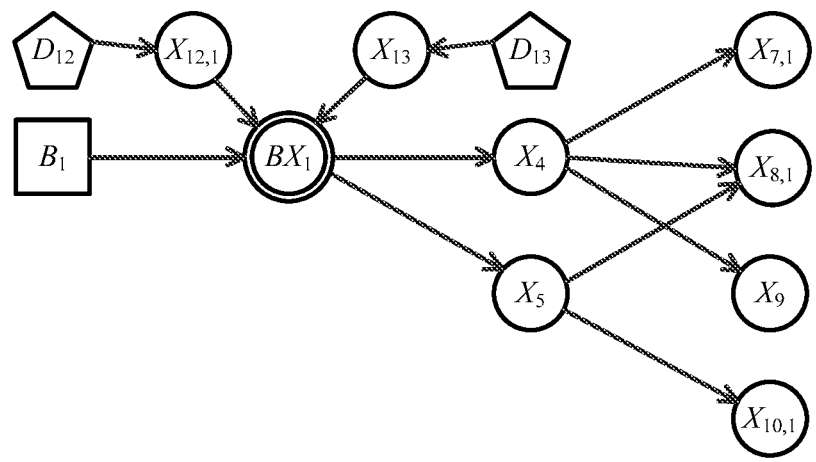
FIG. 14: The results of dividing and simplifying FIG. 13 based on $BX_1$.

Take the first three X-type variables into detection. Assume the results are $X_{8,1}$, and $X_{6,0}$ respectively. Then FIG. 9 becomes FIG. 12. Since $\alpha_{8,1;6,0} = a_{11,0;6,0} = $"-", which means no corresponding causal relationship, FIG. 12 is simplified as FIG. 13 based on the simplification rules, where $E(2) = E^+(1)E(1) = X_{10,1}X_{8,1}X_{6,0}X_{7,1}X_{8,1}X_{10,1}X_{12,1}$. To calculate $h_{1,1}{''}(2)$, $h_{2,1}{''}(2)$, and $h_{2,2}{''}(2)$, FIG. 13 can be divided and simplified as FIG. 14 and FIG. 15. According to the DUCG algorithms in [8], we can obtain that:

Based on FIG. 14, $$\zeta_1(2) = Pr\{E(2)\} = Pr\{X_{7,1}X_{8,1}X_{10,1}X_{12,1}\}$$

$$= Pr\left\{\left(\frac{r_{7;4}}{r_7}A_{7,1;4}\frac{r_{4;1}}{r_4}A_{4;1}BX_1\right)\left(\begin{array}{c}\frac{r_{8;4}}{r_8}A_{8,1;4}\frac{r_{4;1}}{r_4}A_{4;1}BX_1\\+\frac{r_{8;5}}{r_8}A_{8,1;5}\frac{r_{5;1}}{r_5}A_{5;1}BX_1\end{array}\right)\left(\frac{r_{10;5}}{r_{10}}A_{10,1;5}\frac{r_{5;1}}{r_5}A_{5;1}BX_1\right)X_{12,1}\right\}$$

$$= Pr\left\{\begin{array}{l}\left(\frac{r_{7;4}}{r_7}A_{7,1;4}*\frac{r_{8;4}}{r_8}A_{8,1;4}\frac{r_{4;1}}{r_4}A_{4;1}\right)*\left(\frac{r_{10;5}}{r_{10}}A_{10,1;5}\frac{r_{5;1}}{r_5}A_{5;1}\right)BX_1X_{12,1}\\+\left(\frac{r_{7;4}}{r_7}A_{7,1;4}\frac{r_{4;1}}{r_4}A_{4;1}\right)*\left(\frac{r_{8;5}}{r_8}A_{8,1;5}*\frac{r_{10;5}}{r_{10}}A_{10,1;5}\frac{r_{5;1}}{r_5}A_{5;1}\right)BX_1X_{12,1}\end{array}\right\}$$

$$= Pr\left\{\left(\begin{array}{l}\left(\frac{r_{7;4}}{r_7}A_{7,1;4}*\frac{r_{8;4}}{r_8}A_{8,1;4}\frac{r_{4;1}}{r_4}A_{4;1}\right)*\left(\frac{r_{10;5}}{r_{10}}A_{10,1;5}\frac{r_{5;1}}{r_5}A_{5;1}\right)\\+\left(\frac{r_{7;4}}{r_7}A_{7,1;4}\frac{r_{4;1}}{r_4}A_{4;1}\right)*\left(\frac{r_{8;5}}{r_8}A_{8,1;5}*\frac{r_{10;5}}{r_{10}}A_{10,1;5}\right)\end{array}\right)BX_1X_{12,1}\right\}$$

$$= Pr\left\{\left(\begin{array}{l}\left(\frac{1}{1}A_{7,1;4}\frac{1}{2}A_{8,1;4}\frac{1}{1}A_{4;1}\right)*\left(\frac{1}{1}A_{10,1;5}\frac{1}{1}A_{5;1}\right)\\+\left(\frac{1}{1}A_{7,1;4}\frac{1}{1}A_{4;1}\right)*\left(\frac{1}{2}A_{8,1;5}*\frac{1}{1}A_{10,1;5}\frac{1}{1}A_{5;1}\right)\end{array}\right)\left(\frac{r_{1;1}}{r_1}A_{1;1}B_1+\frac{r_{1;12}}{r_1}A_{1;12,1}X_{12,1}\right)X_{12,1}\right\}$$

$$= Pr\left\{\left(\begin{array}{l}\left(A_{7,1;4}*\frac{1}{2}A_{8,1;4}A_{4;1}\right)*(A_{10,1;5}A_{5;1})\\+(A_{7,1;4}A_{4;1})*\left(\frac{1}{2}A_{8,1;5}*A_{10,1;5}A_{5;1}\right)\end{array}\right)\left(\frac{1}{2}A_{1;1}B_1+\frac{1}{2}A_{1;12,1}\right)X_{12,1}\right\}$$

$$= Pr\left\{\left(\begin{array}{l}\left(A_{7,1;4}*\frac{1}{2}A_{8,1;4}A_{4;1}\right)*(A_{10,1;5}A_{5;1})\\+(A_{7,1;4}A_{4;1})*\left(\frac{1}{2}A_{8,1;5}A_{5;1}*A_{10,1;5}\right)\end{array}\right)\left(\frac{1}{2}A_{1;1}B_1+\frac{1}{2}A_{1;12,1}\right)A_{12,1;D}\right\}$$

$$= \left(\begin{array}{l}\left(a_{7,1;4}*\frac{1}{2}a_{8,1;4}a_{4;1}\right)*(a_{10,1;5}a_{5;1})\\+(a_{7,1;4}a_{4;1})*\left(\frac{1}{2}a_{8,1;5}*a_{10,1;5}a_{5;1}\right)\end{array}\right)\left(\frac{1}{2}a_{1;1}b_1+\frac{1}{2}a_{1;12,1}\right)a_{12,1;D}$$

-continued $$= \left(\begin{array}{l}\left((-0.7)*\frac{1}{2}(-0.8)\begin{pmatrix}- & -\\ - & 0.9\end{pmatrix}\right)*\left(((-0.7)\begin{pmatrix}- & -\\ - & 0.7\end{pmatrix})\right)\\ +\left((-0.7)\begin{pmatrix}- & -\\ - & 0.9\end{pmatrix}\right)*\left(\frac{1}{2}(-0.7)*(-0.7)\begin{pmatrix}- & -\\ - & 0.7\end{pmatrix}\right)\end{array}\right)\left(\frac{1}{2}\begin{pmatrix}- & -\\ - & 1\end{pmatrix}\begin{pmatrix}-\\ 0.08\end{pmatrix}+\frac{1}{2}\begin{pmatrix}-\\ 0.7\end{pmatrix}\right)0.1$$

$$= ((-0.12348)+(-0.108045))\begin{pmatrix}-\\ 0.39\end{pmatrix}0.1$$

$$= 0.009029$$

Figure 15:
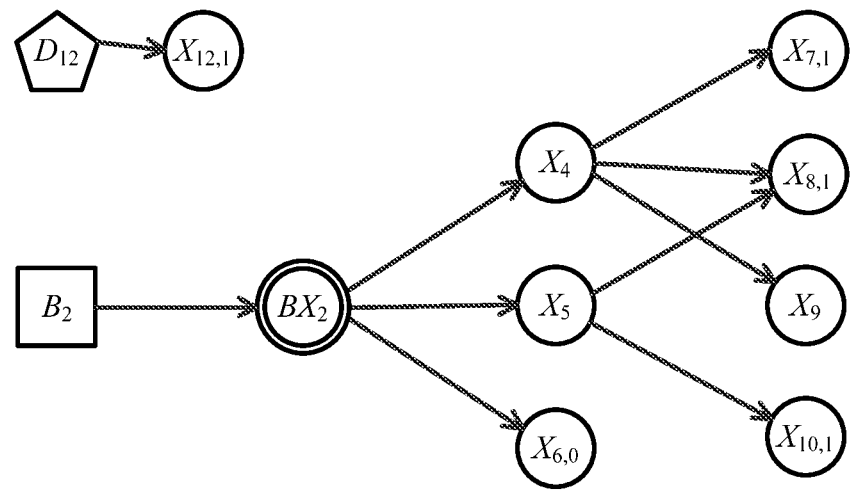
FIG. 15: The results of dividing and simplifying FIG. 13 based on $BX_2$.

Based on FIG. 15, $$\zeta_2(2) = Pr\{E(2)\} = Pr\{X_{6,0}X_{7,1}X_{8,1}X_{10,1}X_{12,1}\}$$

$$= Pr\left\{\frac{r_{6;2}}{r_6}A_{6,0;2}BX_2\frac{r_{7,4}}{r_7}A_{7,1;4}\frac{r_{4;2}}{r_4}A_{4;2}BX_2\begin{pmatrix}\frac{r_{8;4}}{r_8}A_{8,1;4}\frac{r_{4;2}}{r_4}A_{4;2}BX_2\\ +\frac{r_{8;5}}{r_8}A_{8,1;5}\frac{r_{5;2}}{r_5}A_{5;2}BX_2\end{pmatrix}\frac{r_{10;5}}{r_5}A_{10,1;5}\frac{r_{5;2}}{r_5}A_{5;2}BX_2A_{12,1;D}\right\}$$

$$= Pr\left\{\begin{array}{l}\frac{r_{6;2}}{r_6}A_{6,0;2}*\left(\frac{r_{7,4}}{r_7}A_{7,1;4}*\frac{r_{8;4}}{r_8}A_{8,1;4}\frac{r_{4;2}}{r_4}A_{4;2}\right)*\left(\frac{r_{10;5}}{r_5}A_{10,1;5}\frac{r_{5;2}}{r_5}A_{5;2}\right)BX_2A_{12,1;D}\\ +\frac{r_{6;2}}{r_6}A_{6,0;2}*\frac{r_{7,4}}{r_7}A_{7,1;4}\frac{r_{4;2}}{r_4}A_{4;2}*\left(\frac{r_{8;5}}{r_8}A_{8,1;5}*A_{10,1;5}\frac{r_{5;2}}{r_5}A_{5;2}\right)BX_2A_{12,1;D}\end{array}\right\}$$

$$= Pr\left\{\begin{array}{l}\left(\left(\frac{1}{1}A_{6,0;2}*\left(\frac{1}{1}A_{7,1;4}*\frac{1}{2}A_{8,1;4}\frac{1}{1}A_{4;2}\right)*\left(\frac{1}{1}A_{10,1;5}\frac{1}{1}A_{5;2}\right)\right)\\ +\frac{1}{1}A_{6,0;2}*\frac{1}{1}A_{7,1;4}\frac{1}{1}A_{4;2}*\left(\frac{1}{2}A_{8,1;5}*\frac{1}{1}A_{10,1;5}\frac{1}{1}A_{5;2}\right)\end{array}\right\}BX_2A_{12,1;D}$$

$$= Pr\left\{A_{6,0;2}*\begin{pmatrix}\left(A_{7,1;4}*\frac{1}{2}A_{8,1;4}A_{4;2}\right)*(A_{10,1;5}A_{5;2})\\ +A_{7,1;4}A_{4;2}*\left(\frac{1}{2}A_{8,1;5}*A_{10,1;5}A_{5;2}\right)\end{pmatrix}A_{2;2}B_2A_{12,1;D}\right\}$$

$$= a_{6,0;2}*\begin{pmatrix}\left(a_{7,1;4}*\frac{1}{2}a_{8,1;4}a_{4;2}\right)*(a_{10,1;5}a_{5;2})\\ +a_{7,1;4}a_{4;2}*\left(\frac{1}{2}a_{8,1;5}*a_{10,1;5}a_{5;2}\right)\end{pmatrix}a_{2;2}b_2a_{12,1;D}$$

$$= (1\ 1-0.6-0.4\ 1-0.3-0.7)*\begin{pmatrix}\left((-0.7)*\frac{1}{2}(-0.8)\begin{pmatrix}- & - & -\\ - & 0.5 & 0.5\end{pmatrix}\right)\\ *\left((-0.7)\begin{pmatrix}- & - & -\\ - & 0.4 & 0.8\end{pmatrix}\right)\\ +\left((-0.7)\begin{pmatrix}- & - & -\\ - & 0.5 & 0.5\end{pmatrix}\right)*\\ \left(\frac{1}{2}(-0.7)*(-0.7)\begin{pmatrix}- & - & -\\ - & 0.4 & 0.8\end{pmatrix}\right)\end{pmatrix}\begin{pmatrix}- & - & -\\ - & 1 & -\\ - & - & 1\end{pmatrix}\begin{pmatrix}-\\ 0.01\\ 0.02\end{pmatrix}0.1$$

$$= 0$$

According to the algorithms in [8], the weighting coefficients $$\xi_i(y) = \frac{\zeta_i(y)}{\sum_j \zeta_j(y)}$$

of the sub-graphs are:

$$\xi_1(2) = \frac{\zeta_1(2)}{\zeta_1(2)+\zeta_2(2)} = \frac{0.009029}{0.009029+0} = 1$$

$$\xi_2(2) = \frac{\zeta_2(2)}{\zeta_1(2)+\zeta_2(2)} = \frac{0}{0.009029+0} = 0$$

Since $\zeta_2(0)=0$ or $\xi_2(0)=0$, FIG. 15 does not hold and should be eliminated. FIG. 14 is the only valid sub-graph, which means, $BX_{1,1}$ is the only event in $S_H(2)$. According to 10, the ranking procedure ends. The cause of abnormality of the current system is verified as $BX_{1,1}$.

The invention claimed is:

1. A method of efficiently diagnosing a real cause of a system abnormality by recommending an order of detecting states of X-type variables, comprising:
   determining a ranking importance factor corresponding to each of the X-type variables based at least in part on determining a probability importance factor corresponding to each of the X-type variables, wherein the X-type variables are associated with possible causes of the system abnormality, and wherein the probability importance factor corresponding to each of the X-type variables is determined based on:

$$\rho_i(y) = \frac{1}{m_i(y)} \sum_{k \in S_{iK}(y)} \omega_k \sum_{j \in S_{kJ}(y)} \sum_{g \in S_{iG}(y)} Pr\{X_{ig} \mid E(y)\} |Pr\{H_{kj} \mid X_{ig} E(y)\} - Pr\{H_{kj} \mid E(y)\}|$$

Or $$\rho_i(y) = \frac{1}{m_i(y)} \sum_{k \in S_{iK}(y)} \omega_k \sqrt{\sum_{j \in S_{kJ}(y)} \sum_{g \in S_{iG}(y)} (Pr\{X_{ig} \mid E(y)\}(Pr\{H_{kj} \mid X_{ig} E(y)\} - Pr\{H_{kj} \mid E(y)\}))^2}$$

Or $$\rho_i(y) = \frac{1}{m_i(y)} \sum_{k \in S_{iK}(y)} \omega_k \sum_{j \in S_{kJ}(y)} \sum_{g \in S_{iG}(y)} |Pr\{H_{kj} \mid X_{ig} E(y)\} - Pr\{H_{kj} \mid E(y)\}|$$

Or $$\rho_i(y) = \frac{1}{m_i(y)} \sum_{k \in S_{iK}(y)} \omega_k \sqrt{\sum_{j \in S_{kJ}(y)} \sum_{g \in S_{iG}(y)} (Pr\{H_{kj}|X_{ig}E(y)\} - Pr\{H_{kj}|E(y)\})^2}$$

Or $$\rho_i(y) = \frac{1}{m_i(y)} \sum_{k \in S_{iK}(y)} \omega_k \left| \sum_{g \in S_{iG}(y)} Pr\{H_{kj} \mid X_{ig} E(y)\} - \frac{1}{m_i} \sum_{k \in S_{iK}(y)} \sum_{j \in S_{kJ}(y)} \sum_{g \in S_{iG}(y)} Pr\{H_{kj} \mid X_{ig} E(y)\} \right|$$

wherein pi(y) represents a probability importance factor corresponding to a variable $X_i$ indexed by i among the X-type variables in a y-th step of state detection, mi(y) represents a number of states of the $X_i$ variable in the y-th step, $X_{ig}$ represents the variable $X_i$ in a state g, $S_{iG}(y)$ represents possible values of g in the y-th step, $H_{kj}$ represents a possible cause of the system abnormality indexed by k in a state j, $S_{iK}(y)$ represents possible values of k in the y-th step, $S_{kj}$ represents possible values of j in the y-th step, $\omega_k$ represents a danger degree of the $H_k$ possible cause, and E(y) represents evidence comprising already known states of the X-type variables in the y-th step;

ranking the X-type variables based on their respective ranking importance factors;

performing state detections for the X-type variables based on a ranking list of the X-type variables; and determining the real cause of the system abnormality to take correcting actions so as to make the system normal based on results of the state detections associated with at least one subset of the X-type variables.

2. The method according to claim 1, further comprising:

determining the ranking importance factor corresponding to each of the X-type variables based on the probability importance factor, a structure importance factor, and a cost importance factor corresponding to each of the X-type variables;

wherein the structure importance factor corresponding to each of the X-type variables is determined based on the number of different possible causes with which each of the X-type variables is associated; and wherein the cost importance factor corresponding to each of the X-type variables is determined based on a difficulty degree, a waiting time, a price, and a damage degree of performing a state detection for each of the X-type variables.

3. The method according to claim 2, wherein the ranking importance factor corresponding to each of the X-type variables is determined based on:

$$I_i(y) = \frac{\lambda_i(y)\beta_i\rho_i(y)}{\sum_{i \in S_X(y)} \lambda_i(y)\beta_i\rho_i(y)}$$

-continued

Or $$I_i(y) = \lambda_i(y)\beta_i\rho_i(y)$$

Or $$I_i(y) = \frac{\lambda_i(y)\rho_i(y)}{\sum_{i \in S_X(y)} \lambda_i(y)\rho_i(y)}$$

Or $$I_i(y) = \lambda_i(y)\rho_i(y)$$

Or $$I_i(y) = \frac{\beta_i\rho_i(y)}{\sum_{i \in S_X(y)} \beta_i\rho_i(y)}$$

Or $$I_i(y) = \beta_i\rho_i(y)$$

Or $$I_i(y) = \frac{\rho_i(y)}{\sum_{i \in S_X(y)} \rho_i(y)}$$

Or $$I_i(y) = \rho_i(y)$$

Or $$I_i(y) = w_1\lambda_i(y) + w_2\rho_i(y) + w_3\beta_i$$

Or $$I_i(y) = \frac{w_1\lambda_i(y) + w_2\rho_i(y) + w_3\beta_i}{\sum_{i \in S_X(y)} w_1\lambda_i(y) + w_2\rho_i(y) + w_3\beta_i}$$

wherein $I_i(y)$ represents a ranking importance factor corresponding to the variable $X_i$ among the X-type variables, $\lambda i(y)$ represents a structure importance factor corresponding to the variable $X_i$ among the X-type variables, $\rho i(y)$ represents the probability importance factor corresponding to the variable $X_i$ among the X-type variables, $\beta_i(y)$ represents a cost importance factor corresponding to the variable $X_i$ among the X-type variables, and $w_1$, $w_2$, $w_3$ represents weight values assigned to the structure importance factor $\lambda i(y)$, the probability importance factor $\rho i(y)$, and the cost importance factor $\beta_i(y)$, respectively.

4. The method according to claim 1, further comprising:
determining a structure importance factor corresponding to each of the X-type variables based on a number of different possible causes with which each of the X-type variables is associated, and determining the ranking importance factor corresponding to each of the X-type variables based at least in part on the probability importance factor and the structure importance factor corresponding to each of the X-type variables.

5. The method according to claim 1, further comprising:
assigning a value to each of a plurality of states corresponding to each of the possible causes based on their respective danger degrees.

6. The method according to claim 1, further comprising:
determining a cost importance factor corresponding to each of the X-type variables based on a difficulty degree, a waiting time, a price, and a damage degree of performing a state detection for each of the X-type variables.

7. The method according to claim 1, further comprising:
in response to determining that a first variable with a higher rank is an ancestor or descendant variable of a second variable with a lower rank, eliminating the second variable from the ranking list of the X-type variables, wherein the first variable and the second variable are among the X-type variables; and in response to determining that any particular variable among the X-type variables has a ranking importance factor equal to zero, eliminating the any particular variable from the ranking list of the X-type variables.

* * * * *